(12) United States Patent
Suzuki et al.

(10) Patent No.: US 11,506,987 B2
(45) Date of Patent: Nov. 22, 2022

(54) ELECTROPHOTOGRAPHIC PHOTORECEPTOR, METHOD OF MANUFACTURING THE PHOTORECEPTOR, AND ELECTROPHOTOGRAPHIC DEVICE

(71) Applicant: FUJI ELECTRIC CO., LTD., Kawasaki (JP)

(72) Inventors: Shinjiro Suzuki, Matsumoto (JP); Tomoki Hasegawa, Hino (JP); Fengqiang Zhu, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 17/140,851

(22) Filed: Jan. 4, 2021

(65) Prior Publication Data

US 2021/0124279 A1    Apr. 29, 2021

Related U.S. Application Data

(63) Continuation of application No. PCT/JP2019/028090, filed on Jul. 17, 2019.

(51) Int. Cl.
| | | |
|---|---|---|
| *G03G 5/087* | (2006.01) | |
| *G03G 5/047* | (2006.01) | |
| *G03G 5/06* | (2006.01) | |
| *C08L 63/04* | (2006.01) | |
| *G03G 5/05* | (2006.01) | |

(52) U.S. Cl.
CPC .............. *G03G 5/047* (2013.01); *C08L 63/04* (2013.01); *G03G 5/055* (2013.01); *G03G 5/0525* (2013.01);
(Continued)

(58) Field of Classification Search
CPC ...... G03G 5/071; G03G 5/072; G03G 5/0732; G03G 5/06142; G03G 5/06144; G03G 5/061443
See application file for complete search history.

(56) References Cited

U.S. PATENT DOCUMENTS

| | | | |
|---|---|---|---|
| 5,213,924 A | 5/1993 | Sakamoto | |
| 6,416,915 B1 * | 7/2002 | Kikuchi | G03G 5/0614 399/116 |

(Continued)

FOREIGN PATENT DOCUMENTS

| | | |
|---|---|---|
| JP | S6162040 A | 3/1986 |
| JP | H03273256 A | 12/1991 |

(Continued)

OTHER PUBLICATIONS

Translation of JP 2001-166518.*

*Primary Examiner* — Peter L Vajda
(74) *Attorney, Agent, or Firm* — Rabin & Berdo, P.C.

(57) ABSTRACT

An electrophotographic photoreceptor includes a conductive substrate and a photosensitive layer containing a charge transport portion including a first hole transport material represented by General Formula (1) below, a cured resin, and a cross-linked structure there between:

(1)

$$\text{Za-O-(Zb)}l \underset{(Rc)m}{\overset{(Ra)n}{\underset{|}{N}}} \underset{(Rb)o}{\overset{}{\underset{|}{\diagup}}} \underset{(Rd)p}{\overset{}{\diagdown_q}} \underset{(Rb)o}{\overset{}{\underset{|}{\diagup}}} \underset{(Rc)m}{\overset{(Ra)n}{\underset{|}{N}}} \text{(Zb)}l\text{-O-Za,}$$

where Za is a polymerizable functional group with a Structural Formula (2), (3), or (4), Zb is a divalent group with a Structural Formula (6) or (7), Ra, Rb, Rc and Rd each are one of a branched or unbranched alkyl group having from 1 to 6 carbon atoms, an alkoxy group having from 1 to 6

(Continued)

carbon atoms, a substituted or unsubstituted phenyl group, or a substituted or unsubstituted styryl group, l is 0 or 1 when Za is (2) or (4) and 1 when Za is (3), m is from 0 to 5, n, o, and p are each from 0 to 4, q is from 1 to 3.

20 Claims, 2 Drawing Sheets

(52) U.S. Cl.
CPC ......... *G03G 5/0542* (2013.01); *G03G 5/0696* (2013.01); *G03G 5/06144* (2020.05); *G03G 5/087* (2013.01)

(56) References Cited

U.S. PATENT DOCUMENTS

2005/0069792 A1  3/2005  Ichiguchi et al.

2007/0281227 A1* 12/2007  Maruo ................. G03G 5/0614
                                                            430/58.05
2015/0253720 A1*  9/2015  Kurimoto .......... G03G 21/0005
                                                            430/56

FOREIGN PATENT DOCUMENTS

| | | | | |
|---|---|---|---|---|
| JP | H04179961 A | | 6/1992 | |
| JP | 2000147814 A | | 5/2000 | |
| JP | 2001-166518 | * | 6/2001 | ............. G03G 5/147 |
| JP | 2001166518 A | | 6/2001 | |
| JP | 2003302776 A | | 10/2003 | |
| JP | 2004085644 A | | 3/2004 | |
| JP | 2004354759 A | | 12/2004 | |
| JP | 2005126411 A | | 5/2005 | |
| JP | 2008009114 A | | 1/2008 | |
| JP | 2016009066 A | | 1/2016 | |
| JP | 2018087941 A | | 6/2018 | |

* cited by examiner

ELECTROPHOTOGRAPHIC PHOTORECEPTOR, METHOD OF MANUFACTURING THE PHOTORECEPTOR, AND ELECTROPHOTOGRAPHIC DEVICE

CROSS REFERENCE TO RELATED APPLICATIONS

This is a continuation application of International Application PCT/JP2019/028090 filed on Jul. 17, 2019, the contents of which are incorporated herein by reference.

TECHNICAL FIELD

The present invention relates to an electrophotographic photoreceptor (hereinafter also referred to simply as "photoreceptor") for use in an electrophotographic printer, a copier, a fax machine, and the like, a method of manufacturing the photoreceptor, and an electrophotographic device. In particular, the present invention relates to an electrophotographic photoreceptor capable of realizing excellent wear resistance and stability of electrical properties by including a specific charge transport material in a photosensitive layer, a method of manufacturing the photoreceptor, and an electrophotographic device.

BACKGROUND ART

An electrophotographic photoreceptor basically has a structure in which a photosensitive layer having a photoconductive function is placed on a conductive substrate. In recent years, research and development of organic electrophotographic photoreceptors, which use organic compounds as functional components responsible for generation or transport of charges, have been actively pursued due to advantages of a wide variety of materials, high productivity, and safety, and such photoreceptors are being applied to copiers and printers.

In general, a photoreceptor needs to function to retain surface charge in a dark place, to accept light and generate a charge, and also to transport the generated charge. A photosensitive layer is responsible for these functions. Photoreceptors can be classified into monolayer photoreceptors and layered (functionally separated) photoreceptors, depending on the type of photoreceptor layer. A monolayer photoreceptor includes a monolayer photoreceptor layer having a charge generation function and a charge transport function. A layered photoreceptor includes a photoreceptor layer formed by layering a charge generation layer and a charge transport layer. The charge generation layer is mainly responsible for a function of charge generation at the time of receiving light. The charge transport layer is responsible for a function of retaining surface charge in a dark place and transporting the charge generated in the charge generation layer at the time of receiving light.

The above-described photosensitive layer is typically formed by applying a coating liquid, in which a charge generation material and a charge transport material and a resin binder are dissolved or dispersed in an organic solvent, to a conductive substrate. Particularly for layers at the outermost surface of such organic electrophotographic photoreceptors, a polycarbonate that is resistant to friction with papers or a blade for toner removal and has excellent flexibility and favorable permeability for exposure is often used as a resin binder. In particular, bisphenol Z polycarbonate is widely used as a resin binder. A technique using such polycarbonate as a resin binder is described, for example, in Patent Document 1.

In recent years, with increasing number of printouts due to networking in offices and rapid development of light printing machines using electrophotography, and the like, electrophotographic printers are increasingly demanded to have not only high wear resistance, high durability, high sensitivity, and fast response, but also contamination resistance against oils and fats such as sebum.

In addition, with recent development of color printers and increasing prevalence of color printers, the printing speed is increasing, the size of devices and the number of parts used are being reduced, and there is a need to respond to a variety of operating environments. Under these circumstances, there is a noticeable increase in demand for a photoreceptor with small variations in image and electrical properties due to repeated use or variations in the operating environment (room temperature and environmental conditions), and conventional techniques are no longer able to adequately meet these demands at the same time.

In order to solve these problems, a variety of methods for improving the outermost surface layer of a photoconductor have been proposed.

Various polycarbonate resin structures have been proposed for improving the durability of a photoconductor surface. For example, in Patent Documents 2 to 4, polycarbonate resins containing specific structures have been proposed, but insufficient studies have been made regarding compatibility with a variety of charge transporters or additives or the solubility of the resins, resulting in difficulties in maintaining stable electrical properties in long-term use, which is problematic. Patent Document 5 proposes a polycarbonate resin including a specific structure, but a resin having a bulky structure has a lot of spaces between polymers, and discharging substances during charging, contacting members, foreign substances, and the like may easily penetrate a photosensitive layer, making it difficult to obtain sufficient durability.

On the other hand, Patent Document 6 proposes a method of forming a surface layer formed from a cross-linked structure charge transport material and a curable resin on the outermost surface of a photosensitive layer. However, in this case, by providing an outermost surface layer, the charge transport property decreases due to an increase in production steps and an increase in the number of interfaces, which may result in difficulty in obtaining sufficient sensitivity.

Patent Document 7 describes an electrophotographic photoreceptor including one or both of a hole-transporting compound having a specific chain-polymerizable functional group and a hole-transporting compound which is polymerized or cross-linked by heat or ultraviolet light and cured. In this case, however, although Patent Document 7 describes that the photoreceptor has excellent wear resistance, contamination resistance has not been examined. Patent Document 8 discloses a technique for providing a cross-linked surface layer or a cross-linked charge transport layer on the surface of a photoreceptor used in an electrophotographic device. However, also in this case, although Patent Document 8 describes that the photosensitive layer has a high level of wear resistance, contamination resistance has not been examined. Patent Document 9 describes a monolayer electrophotographic photoreceptor in which a photosensitive layer is composed of at least a charge generating substance, a polymeric charge transport substance, an acceptor compound, and a graft copolymer having a core/shell structure. However, also in this case, although Patent Document 9 describes that the use of a particular polymeric charge transport substance results in favorable wear resistance, contamination resistance has not been examined.

RELATED ART DOCUMENTS

Patent Documents

Patent Document 1 JPS61-62040A
Patent Document 2 JP2004-354759A
Patent Document 3 JPH04-179961A
Patent Document 4 JPH03-273256A
Patent Document 5 JP2004-085644A
Patent Document 6 JP2016-009066A
Patent Document 7 JP2000-147814A
Patent Document 8 JP2008-009114A
Patent Document 9 JP2003-302776A

SUMMARY OF THE INVENTION

Problems to be Solved by the Invention

As described above, a variety of techniques have been conventionally proposed for improving the outermost surface layer of a photoconductor. However, techniques described in these Patent Documents are not sufficient in all respects with respect to durability, sensitivity, and image defects in actual use. The contamination resistance of the photosensitive layer has not been sufficiently studied, and as a result, it has been necessary to further improve the properties of the photosensitive layer in order to develop a photoreceptor with improved durability.

In view of the above, an object of the present invention is to provide an electrophotographic photoreceptor that has low wear and excellent contamination resistance and that can achieve highly sensitive and stable images even during long-term use, a method of manufacturing the photoreceptor, and an electrophotographic device.

Means for Solving the Problems

In order to solve the above-described problems, the present inventors have intensively studied the material of an outermost surface layer of a photoreceptor, and as a result, provide a photoreceptor having improved wear resistance and contamination resistance, high sensitivity, and stability of image quality even after repeated use. Specifically, the present inventors have found that a favorable electrophotographic photoreceptor can be obtained by applying the following configuration, thereby completing the present invention.

Specifically, a first aspect of the present invention is an electrophotographic photoreceptor including:
a conductive substrate; and
a photosensitive layer formed on the conductive substrate, wherein
the photosensitive layer contains a first hole transport material represented by the following general formula (1) and a curable resin having a cross-linked structure as a resin binder, and has a cross-linked structure derived from the first hole transport material:

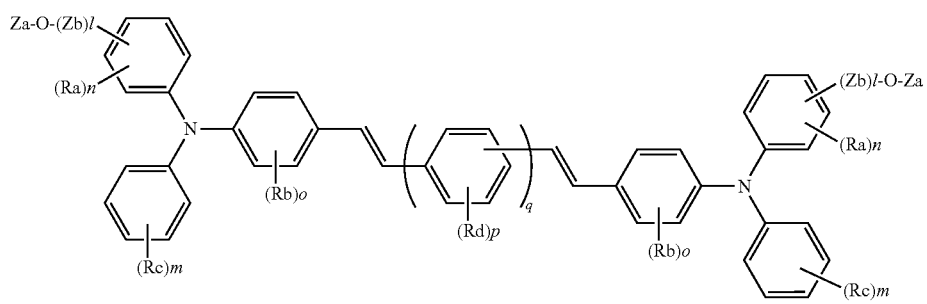

(1)

where:
in the formula (1), Za denotes a polymerizable functional group represented by structural formula (2), (3), or (4) below, Zb denotes a divalent group represented by structural formula (5), (6), or (7) below, each of Ra, Rb, Rc and Rd denotes a branched or unbranched alkyl group having from 1 to 6 carbon atoms, an alkoxy group having from 1 to 6 carbon atoms, a substituted or unsubstituted phenyl group, or a substituted or unsubstituted styryl group, l is an integer of 0 or 1, m is an integer in a range of 0 to 5, n, o, and p are each an integer in a range of 0 to 4, and q is an integer in a range of 1 to 3;
in formula (5), s is an integer in a range of 1 to 6;
in formula (6), t is an integer in a range of 1 to 6; and
in formulae (5), (6), and (7), *1 and *2 respectively represent binding positions, wherein Zb is bonded to a phenyl group at a *2 side.

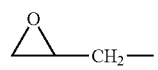

(2)

(3)

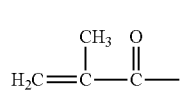

(4)

(5)

(6)

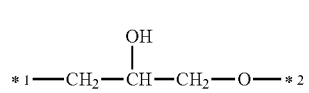

(7)

By including the above-described specific hole transport material in a photosensitive layer, the mechanical strength of the photosensitive layer can be improved, and furthermore, the contamination resistance can also be improved, thereby providing a high-quality photoreceptor.

Preferably, the photosensitive layer contains a second hole transport material including an arylamine structure that is free of a polymerizable functional group represented by the structural formula (2), (3), or (4).

Preferably used for the second hole transport material is a compound represented by one of structural formula (A) or structural formula (B) below:

A third aspect of the present invention is an electrophotographic device including the electrophotographic photoreceptor described above.

Effects of the Invention

The present invention reveals that the use of a photosensitive layer having the above-described conditions provides

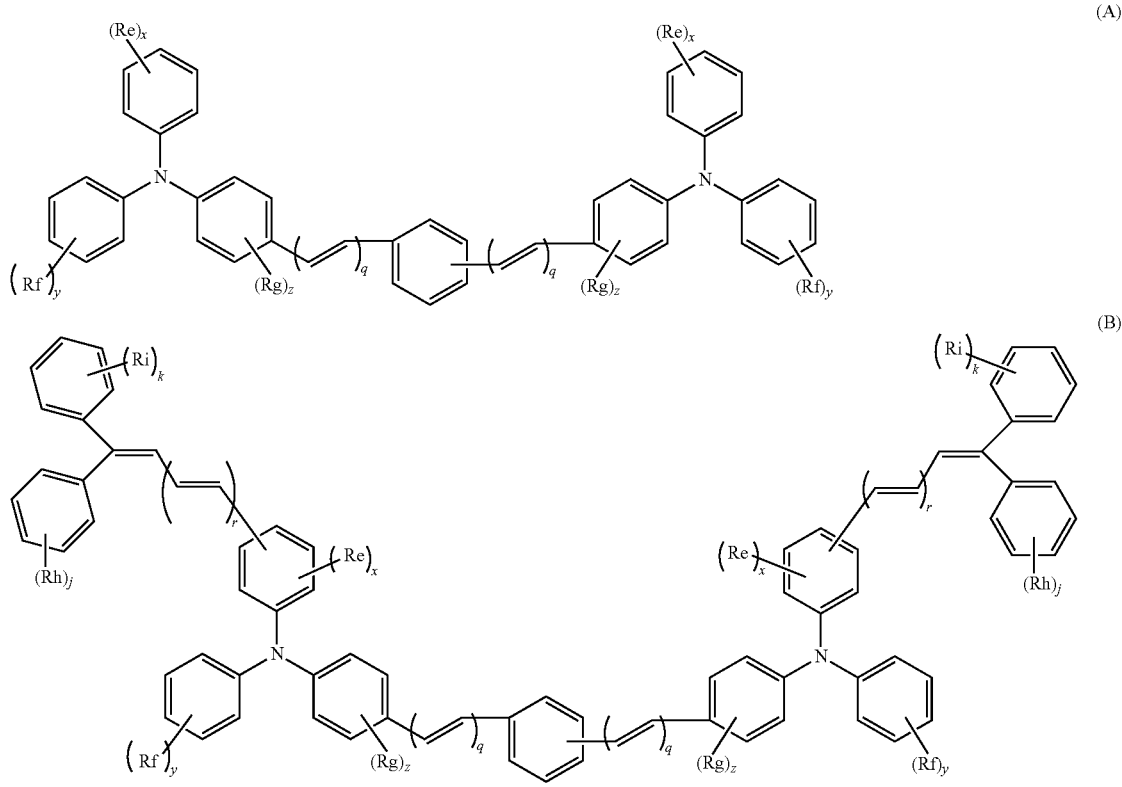

where:

in formulae (A) and (B), each of Re, Rf, Rg, Rh, and Ri is one of a hydrogen atom, a branched or unbranched alkyl group having from 1 to 6 carbon atoms, an alkoxy group having from 1 to 3 carbon atoms, a substituted or unsubstituted phenyl group, a substituted or unsubstituted styryl group, or a substituted or unsubstituted 4-phenylbutadiene group; x and z are each an integer in a range of 0 to 4; j, k, and y are each an integer in a range of 0 to 5; q is an integer in a range of 0 to 2; and r is an integer of 0 or 1.

Preferably, the photosensitive layer contains an electron transport material.

Preferably, used for the curable resin is at least one of an epoxy resin, a phenolic resin, and an acrylic resin.

Preferably, the photosensitive layer contains a charge generation material made of a phthalocyanine compound.

A second aspect of the present invention is a method of manufacturing the electrophotographic photoreceptor described above, the method including: forming the photosensitive layer by a dip coating method using a coating liquid containing the first hole transport material and the curable resin.

a photoreceptor that can maintain stable image quality and control wear performance and contamination resistance.

This is thought to be due to the following reasons. Specifically, conventional photoreceptors use low-molecular-weight hole transport materials that do not form a cross-linked structure as a hole transport material in a photosensitive layer, and such materials are molecularly dispersed in a thermoplastic resin molecule such as a polycarbonate resin to carry out hole transport. In contrast, the present invention uses a material capable of forming a cross-linked structure as a hole transport material, and by curing such a material alone or in combination with a curable resin, the mechanical strength of a photosensitive layer can be improved, and furthermore, when a structural portion responsible for hole transport has this structure, a more sensitive photoreceptor can be obtained. Still further, by using the hole transport material capable of forming a cross-linked structure according to the present invention, a highly sensitive photoreceptor can be obtained even with the addition of some hole transport materials that do not have a cross-linked structure.

MODE FOR CARRYING OUT THE INVENTION

Specific embodiments of the electrophotographic photoreceptor according to an embodiment of the present invention will now be described in detail using the drawings. The present invention is not limited in any way by the following description.

Figure 1A:
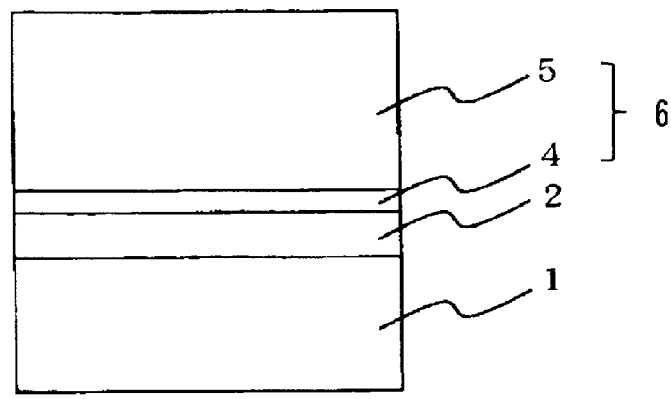
FIG. 1A is a schematic sectional view illustrating an example of an electrophotographic photoreceptor according to an embodiment of the present invention.
Figure 1B:
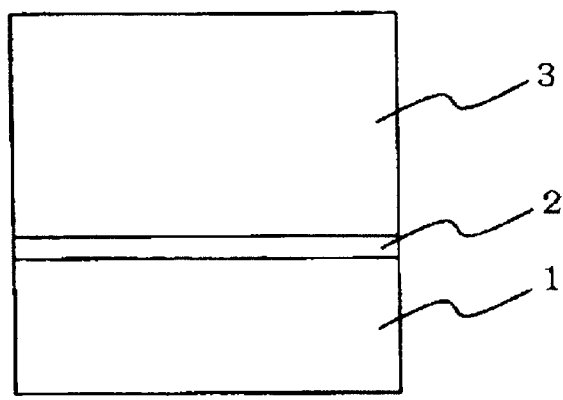
FIG. 1B is a schematic sectional view illustrating another example of an electrophotographic photoreceptor according to an embodiment of the present invention.
Figure 1C:
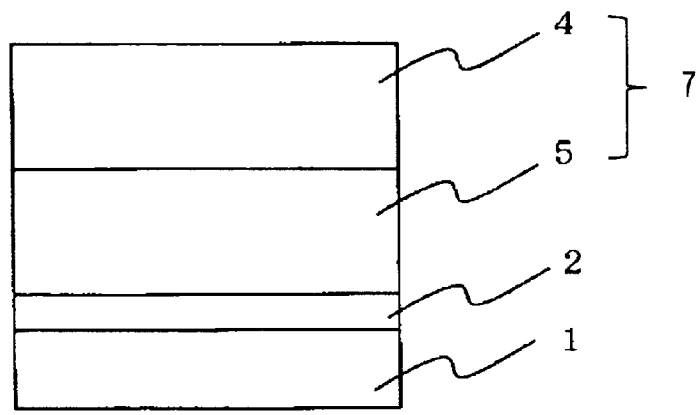
FIG. 1C is a schematic sectional view illustrating still another example of an electrophotographic photoreceptor according to an embodiment of the present invention.

As described above, electrophotographic photoreceptors are roughly classified into negatively charged layered photoreceptors and positively charged layered photoreceptors, as layered (functionally separated) photoreceptors, and monolayer photoreceptors used primarily in a positively charged type. FIGS. 1A to 1C are schematic sectional views illustrating an example of an electrophotographic photoreceptor according to an embodiment of the present invention. FIG. 1A illustrates a negatively charged layered electrophotographic photoreceptor, FIG. 1B illustrates a positively charged monolayer electrophotographic photoreceptor, and FIG. 1C illustrates a positively charged layered electrophotographic photoreceptor.

As illustrated in FIG. 1A, in a negatively charged layered photoreceptor, on top of a conductive substrate 1, an undercoat layer 2 and a photoreceptor layer 6 including a charge generation layer 4 having a charge generation function and a charge transport layer 5 having a charge transport function are layered in order. In a positively charged monolayer photoreceptor, FIG. 1B on top of a conductive substrate 1, an undercoat layer 2 and a monolayer photoreceptor layer 3 having both a charge generation function and a charge transport function are layered in order. Furthermore, in a positively charged layered photoreceptor, FIG. 1C on top of a conductive substrate 1, an undercoat layer 2, a photoreceptor layer 7 including a charge transport layer 5 having a charge transport function, and a charge generation layer 4 having both a charge generation function and a charge transport function are layered in order. In all types of photoreceptors, the undercoat layer 2 may be added if necessary.

The photoreceptor according to an embodiment of the present invention is a photoreceptor including at least a photosensitive layer on a conductive substrate, wherein the photosensitive layer contains a cross-linked structure derived from a first hole transport material represented by the general formula (1). In other words, a first hole-transport material represented by the general formula (1) can form a cross-linked structure by connecting molecular chains with each other.

In the case of a layered photoreceptor, a charge generation layer or a charge transport layer is a photosensitive layer containing the above-described first hole transport material, and in the case of a monolayer photoreceptor, a monolayer photoreceptor layer is a photoreceptor layer containing the above-described first hole transport material. In particular, when a photosensitive layer including the above-described first hole transport material is the outermost surface layer, an effect of improving wear resistance and contamination resistance is favorably obtained, which is preferable. The outermost surface layer is the layer located farthest from a conductive substrate in two or more functional layers formed on the conductive substrate.

In the positively charged layered photoconductor illustrated in FIG. 1C, although the charge transport layer is not the outermost surface layer, when the above-described first hole transport material is used for the charge transport layer, the solubility resistance of the charge transport layer to a solvent for a charge generation layer when applying the charge generation layer is improved, which is preferable.

As the first hole transport material having the structure represented by the above-described general formula (1), specifically, those listed in Tables 1 and 2 below can be suitably used.

TABLE 1

| Structure example | Za | Zb | (Zb) I | I position | Ra | n | Position | Rb | o | Position | Rc | m | Position | Rd | p | Position | Styryl triphenyl amine skeleton q position |
|---|---|---|---|---|---|---|---|---|---|---|---|---|---|---|---|---|---|
| (1)-1-1 | (2) | — | 0 | p-position | — | 0 | — | — | 0 | — | — | 0 | — | — | 0 | — | 1 p-position |
| (1)-1-2 | (2) | — | 0 | p-position | — | 0 | — | — | 0 | — | CH3 | 1 | p- | — | 0 | — | 1 p-position |
| (1)-1-3 | (2) | — | 0 | p-position | — | 0 | — | — | 0 | — | CH3 | 1 | m- | — | 0 | — | 1 p-position |
| (1)-1-4 | (2) | — | 0 | p-position | — | 0 | — | — | 0 | — | CH3 | 1 | o- | — | 0 | — | 1 p-position |
| (1)-1-5 | (2) | — | 0 | p-position | — | 0 | — | — | 0 | — | CH3 | 2 | o-, p- | — | 0 | — | 1 p-position |
| (1)-1-6 | (2) | — | 0 | p-position | — | 0 | — | — | 0 | — | CH3 | 3 | o-, p-, o- | — | 0 | — | 1 p-position |
| (1)-1-7 | (2) | — | 0 | p-position | CH3 | 1 | o- | — | 0 | — | — | 0 | — | — | 0 | — | 1 p-position |
| (1)-1-8 | (2) | — | 0 | p-position | CH3 | 1 | o- | — | 0 | — | CH3 | 1 | p- | — | 0 | — | 1 p-position |
| (1)-1-9 | (2) | — | 0 | p-position | CH3 | 1 | o- | — | 0 | — | CH3 | 1 | m- | — | 0 | — | 1 p-position |
| (1)-1-10 | (2) | — | 0 | p-position | CH3 | 1 | o- | — | 0 | — | CH3 | 1 | o- | — | 0 | — | 1 p-position |
| (1)-1-11 | (2) | — | 0 | p-position | CH3 | 1 | o- | — | 0 | — | CH3 | 2 | o-, p- | — | 0 | — | 1 p-position |
| (1)-1-12 | (2) | — | 0 | p-position | CH3 | 1 | o- | — | 0 | — | CH3 | 3 | o-, p-, o- | — | 0 | — | 1 p-position |
| (1)-1-13 | (2) | (6), t = 2 | 1 | p-position | CH3 | 1 | o- | — | 0 | — | — | 0 | — | — | 0 | — | 1 p-position |
| (1)-1-14 | (2) | (6), t = 2 | 1 | p-position | CH3 | 1 | o- | — | 0 | — | CH3 | 1 | o- | — | 0 | — | 1 p-position |
| (1)-1-15 | (2) | (6), t = 2 | 1 | p-position | CH3 | 1 | o- | — | 0 | — | CH3 | 2 | o-, p- | — | 0 | — | 1 p-position |
| (1)-1-16 | (2) | — | 0 | p-position | CH3 | 1 | o- | CH3 | 1 | o- | — | 0 | — | — | 0 | — | 1 p-position |
| (1)-1-17 | (2) | — | 0 | p-position | CH3 | 1 | o- | CH3 | 1 | o- | CH3 | 1 | o- | — | 0 | — | 1 p-position |
| (1)-1-18 | (2) | — | 0 | p-position | CH3 | 1 | o- | CH3 | 1 | o- | CH3 | 2 | o-, p- | — | 0 | — | 1 p-position |
| (1)-1-19 | (2) | — | 0 | p-position | CH3 | 1 | o- | — | 0 | — | — | 0 | — | CH3 | 1 | o- | 1 p-position |

TABLE 1-continued

| Structure example | Za | Zb | (Zb) I | I position | Ra | n | Position Rb | o | Position | Rc | m | Position | Rd | p | Position | q | Styryl triphenyl amine skeleton position |
|---|---|---|---|---|---|---|---|---|---|---|---|---|---|---|---|---|---|
| (1)-1-20 | (2) | — | 0 | p-position | CH3 | 1 | o- | — | 0 | — | CH3 | 1 | o- | CH3 | 1 | o- | 1 | p-position |
| (1)-1-21 | (2) | — | 0 | p-position | CH3 | 1 | o- | — | 0 | — | CH3 | 2 | o-, p- | CH3 | 1 | o- | 1 | p-position |
| (1)-1-22 | (2) | — | 0 | p-position | CH3 | 1 | o- | — | 0 | — | CH3 | 2 | o-, p- | — | 0 | — | 1 | m-position |
| (1)-1-23 | (2) | — | 0 | p-position | CH3 | 1 | o- | — | 0 | — | CH3 | 2 | o-, p- | — | 0 | — | 1 | o-position |

※) In the case of I = 0, "(Zb)I position" corresponds to Za position.

TABLE 2

| Structure example | Za | Zb | (Zb) I | I position | Ra | n | Position Rb | o | Position | Rc | m | Position | Rd | p | Position | q | Styryl triphenyl amine skeleton position |
|---|---|---|---|---|---|---|---|---|---|---|---|---|---|---|---|---|---|
| (1)-1-24 | (2) | — | 0 | p-position | — | 0 | — | — | 0 | — | C2H5 | 1 | o- | — | 0 | — | 1 | p-position |
| (1)-1-25 | (2) | — | 0 | p-position | — | 0 | — | — | 0 | — | C6H13 | 1 | p- | — | 0 | — | 1 | p-position |
| (1)-1-26 | (2) | (5), S = 1 | 1 | p-position | CH3 | 1 | o- | — | 0 | — | — | 0 | — | — | 0 | — | 1 | p-position |
| (1)-1-27 | (2) | (5), S = 2 | 1 | p-position | CH3 | 1 | o- | — | 0 | — | — | 0 | — | — | 0 | — | 1 | p-position |
| (1)-1-28 | (2) | (5), S = 1 | 1 | p-position | CH3 | 1 | o- | — | 0 | — | CH3 | 2 | o-, p- | — | 0 | — | 1 | p-position |
| (1)-1-29 | (2) | (5), S = 2 | 1 | p-position | CH3 | 1 | o- | — | 0 | — | CH3 | 2 | o-, p- | — | 0 | — | 1 | o-position |
| (1)-1-30 | (2) | — | 0 | p-position | Cl | 1 | o- | — | 0 | — | — | 0 | — | — | 0 | — | 1 | p-position |
| (1)-2-1 | (3) | — | 0 | p-position | — | 0 | — | — | 0 | — | — | 0 | — | — | 0 | — | 1 | p-position |
| (1)-2-2 | (3) | — | 0 | p-position | — | 0 | — | — | 0 | — | CH3 | 1 | p- | — | 0 | — | 1 | p-position |
| (1)-2-3 | (3) | — | 0 | p-position | — | 0 | — | — | 0 | — | CH3 | 1 | m- | — | 0 | — | 1 | p-position |
| (1)-2-4 | (3) | — | 0 | p-position | — | 0 | — | — | 0 | — | CH3 | 1 | o- | — | 0 | — | 1 | p-position |
| (1)-2-5 | (3) | — | 0 | p-position | — | 0 | — | — | 0 | — | CH3 | 2 | o-, p- | — | 0 | — | 1 | p-position |
| (1)-2-6 | (3) | — | 0 | p-position | — | 0 | — | — | 0 | — | CH3 | 3 | o-, p-, o- | — | 0 | — | 1 | p-position |
| (1)-2-7 | (3) | — | 0 | p-position | CH3 | 1 | o- | — | 0 | — | — | 0 | — | — | 0 | — | 1 | p-position |
| (1)-2-8 | (3) | — | 0 | p-position | CH3 | 1 | o- | — | 0 | — | CH3 | 1 | p- | — | 0 | — | 1 | p-position |
| (1)-2-9 | (3) | — | 0 | p-position | CH3 | 1 | o- | — | 0 | — | CH3 | 1 | m- | — | 0 | — | 1 | p-position |
| (1)-2-10 | (3) | — | 0 | p-position | CH3 | 1 | o- | — | 0 | — | CH3 | 1 | o- | — | 0 | — | 1 | p-position |
| (1)-2-11 | (3) | — | 0 | p-position | CH3 | 1 | o- | — | 0 | — | CH3 | 2 | o-, p- | — | 0 | — | 1 | p-position |
| (1)-2-12 | (3) | — | 0 | p-position | CH3 | 1 | o- | — | 0 | — | CH3 | 3 | o-, p-, o- | — | 0 | — | 1 | p-position |
| (1)-3-1 | (4) | — | 0 | p-position | — | 0 | — | — | 0 | — | CH3 | 1 | p- | — | 0 | — | 1 | p-position |
| (1)-4-1 | (3) | (7) | 1 | p-position | CH3 | 1 | o- | — | 0 | — | — | 0 | — | — | 0 | — | 1 | p-position |
| (1)-5-1 | (2) | — | 0 | p-position | — | 0 | — | — | 0 | — | CH3 | 1 | p- | — | 0 | — | 2 | p-position |
| (1)-5-2 | (2) | — | 0 | p-position | CH3 | 1 | o- | — | 0 | — | CH3 | 2 | o-, p- | — | 0 | — | 2 | p-position |

The structural formulae of some of the first hole transport materials listed in Tables 1 and 2 are illustrated below.

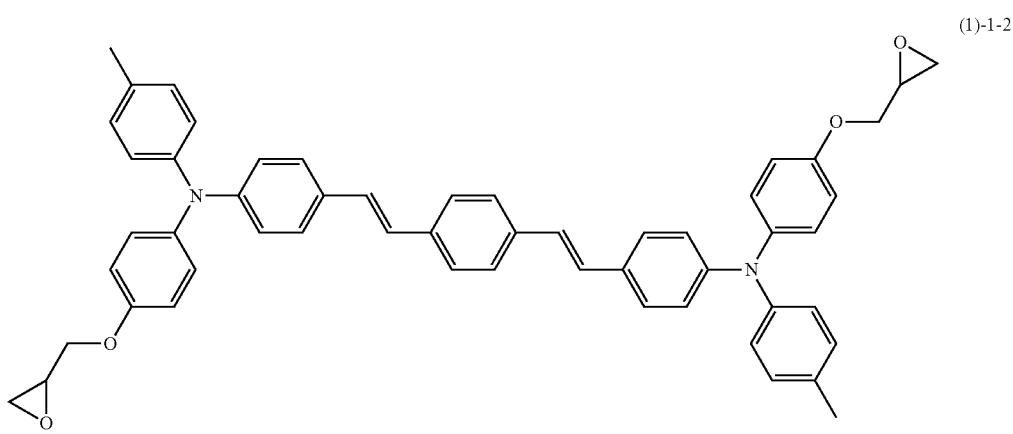

(1)-1-2

-continued
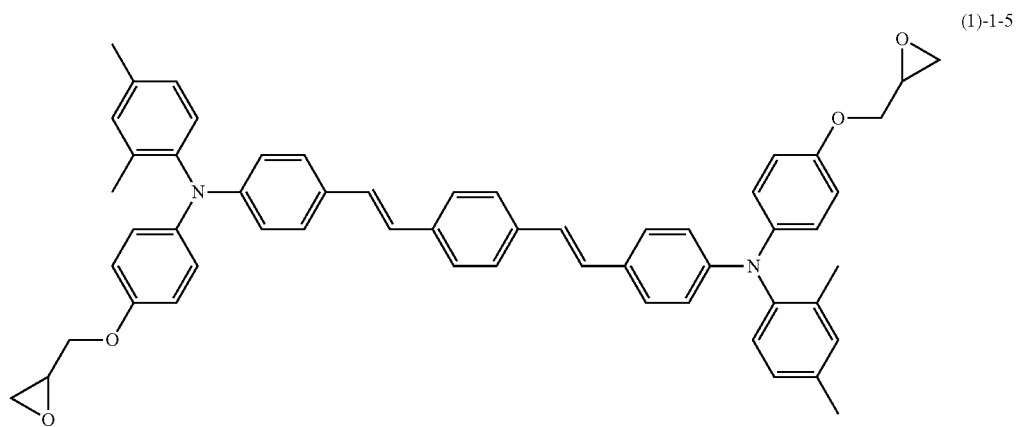
(1)-1-5
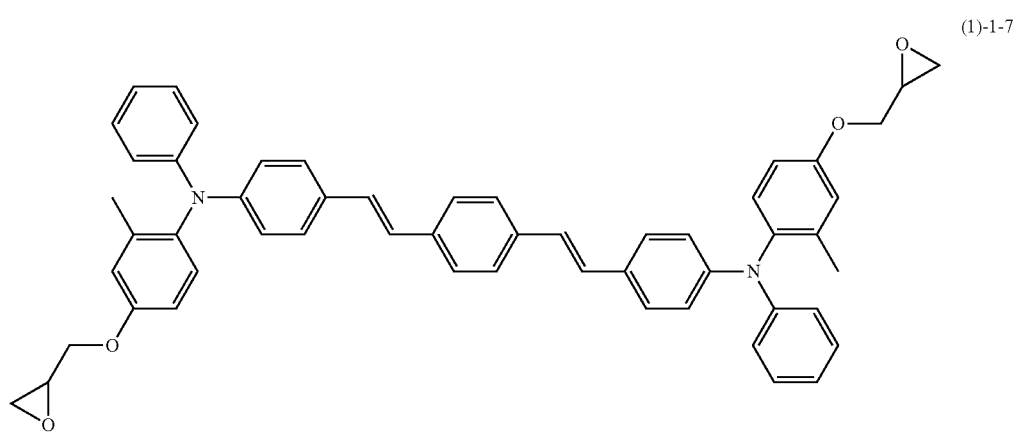
(1)-1-7
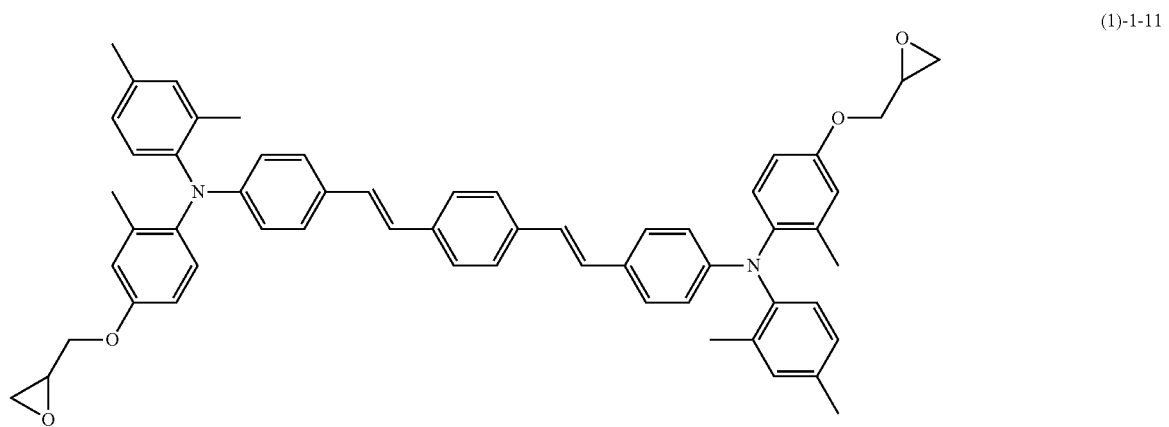
(1)-1-11

-continued
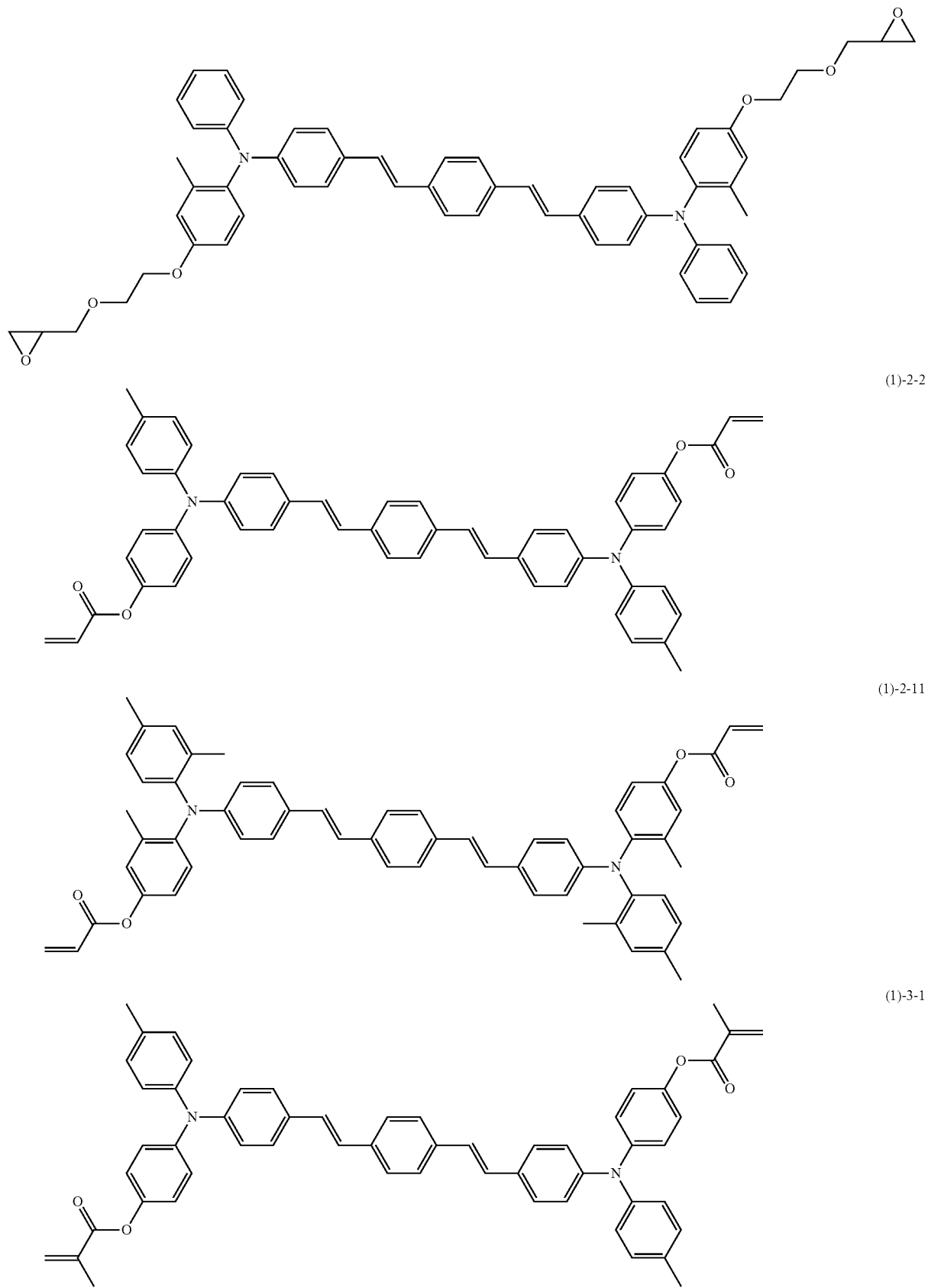
(1)-1-13
(1)-2-2
(1)-2-11
(1)-3-1

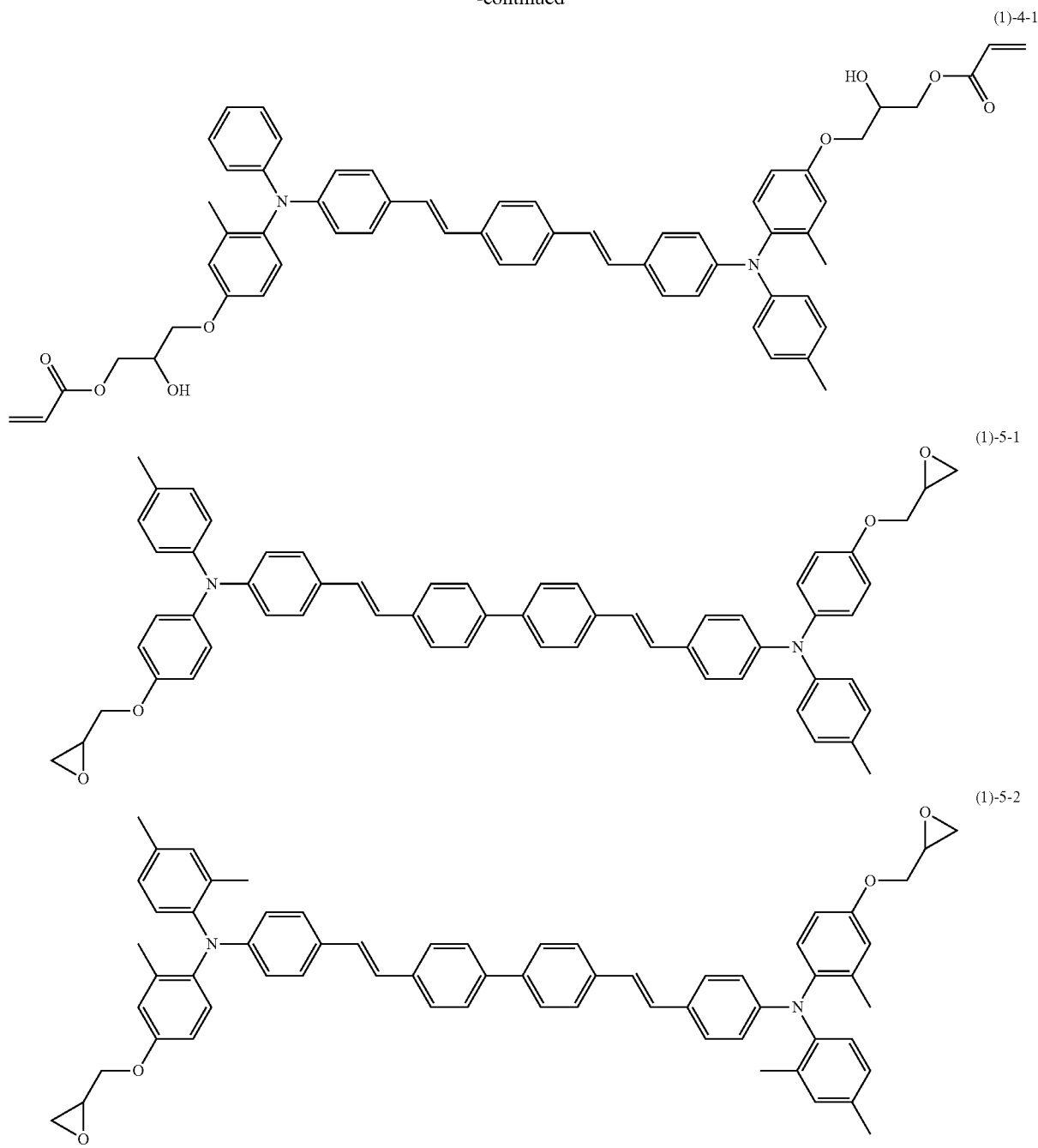

The above-described photosensitive layer may use another charge transport material in combination with the above-described first hole transport material. As such another charge transport material, a hole transport material containing an arylamine structure, other than the above-described first hole transport material, can be suitably used. More suitably, along with the above-described first hole transport material, a second hole transport material containing an arylamine structure without a polymerizable functional group represented by the above-described structural formula (2), (3), or (4) is used.

As the above-described second hole transport material, specifically, any one of compounds represented by the above-described structural formulae (A) and (B) containing a conjugated structure similar to the structure of the conjugated moiety of the above-described general formula (1) can be suitably used.

As the above-described second hole transport material, more specifically, an arylamine compound represented by the following structural formulae (II-1) to (II-34) is preferably used, but is not limited thereto as long as the compound exhibits charge transport properties.

II-1
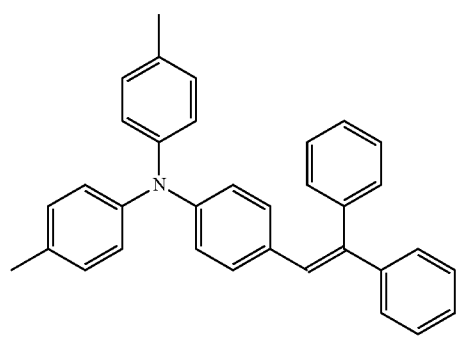
II-2
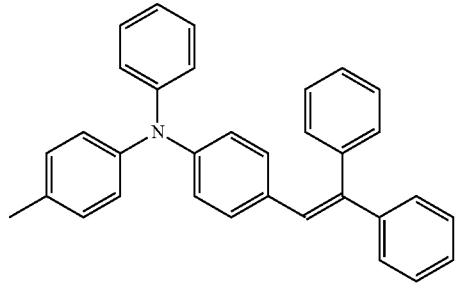
II-3
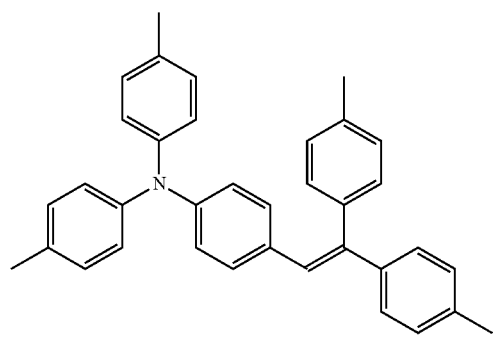
II-4
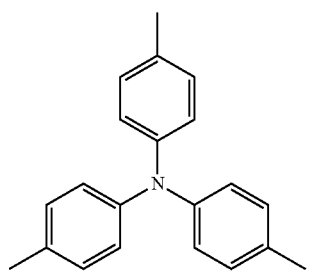
II-5
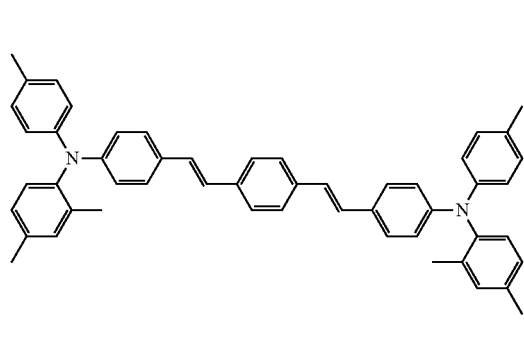
II-6
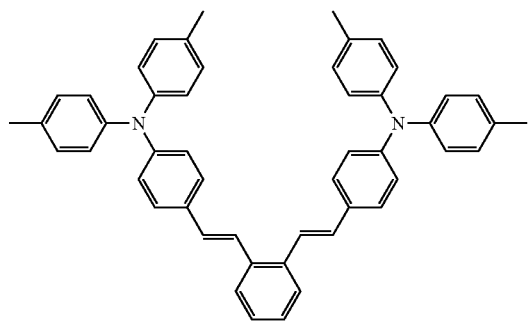
II-7
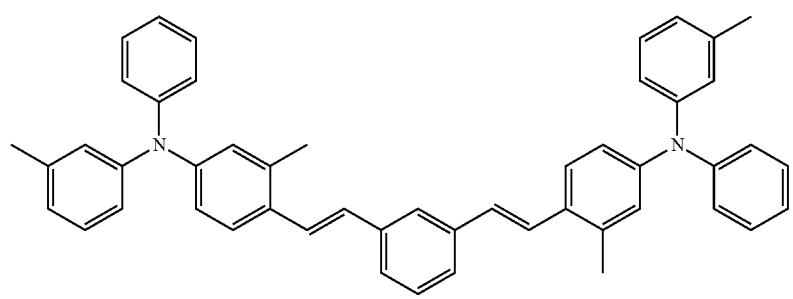

II-8
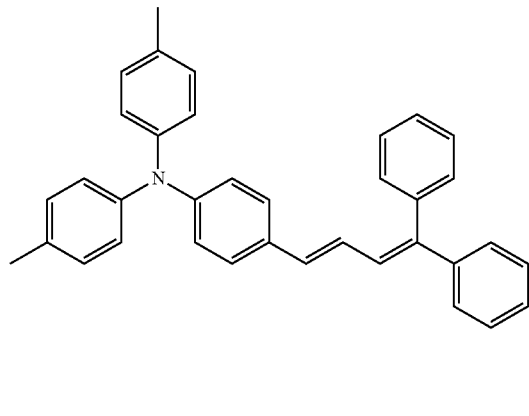
II-9
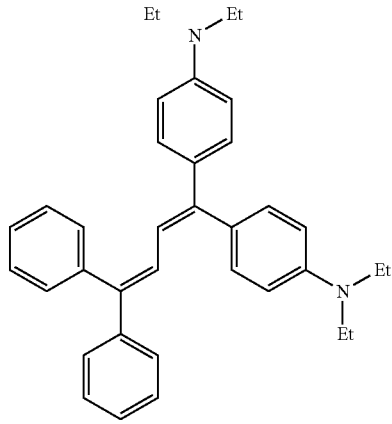
II-10
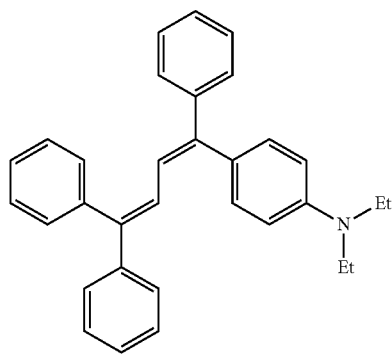
II-11
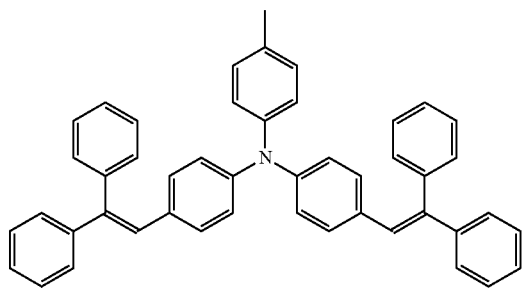
II-12
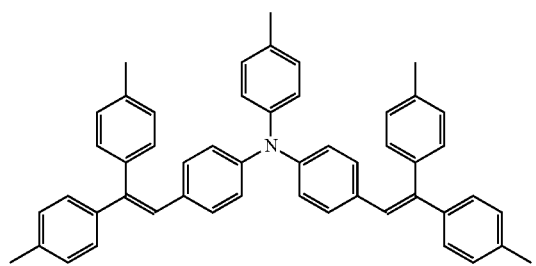
II-13
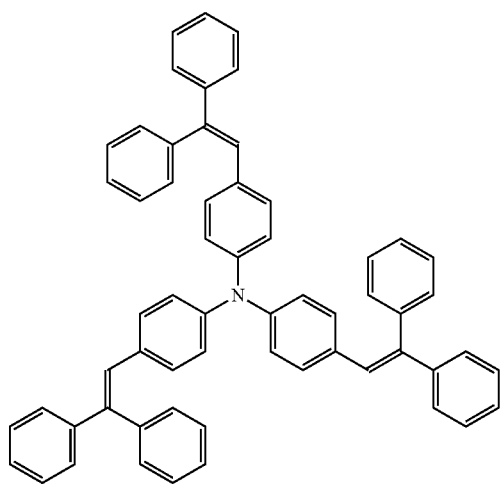

-continued
II-14
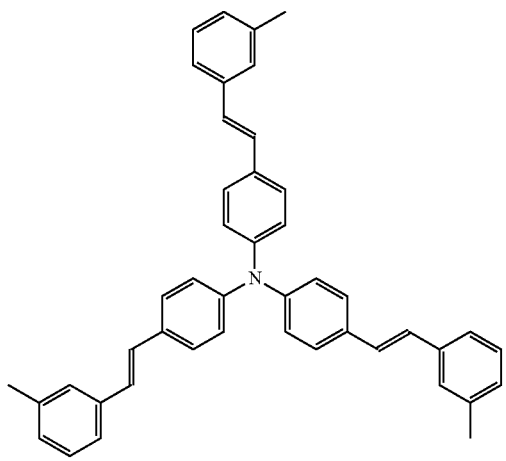
II-15
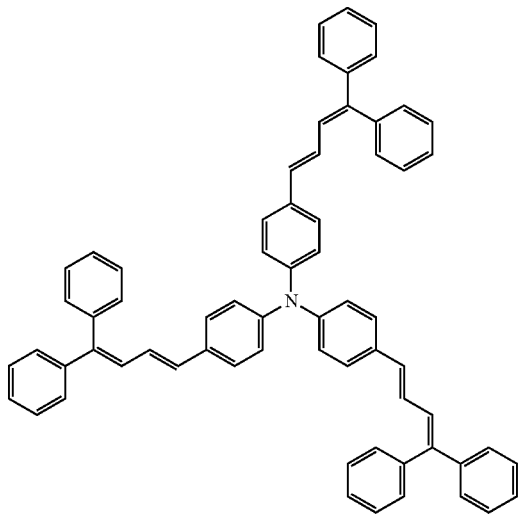
II-16
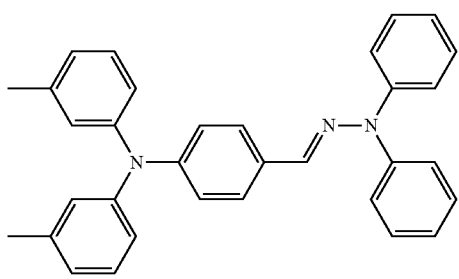
II-17
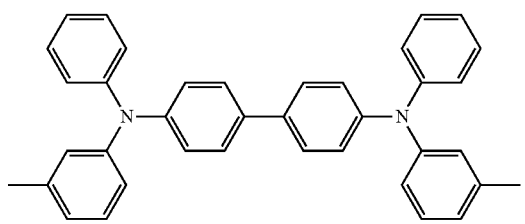
II-18
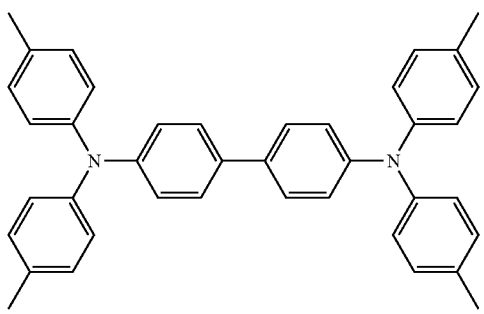
II-19
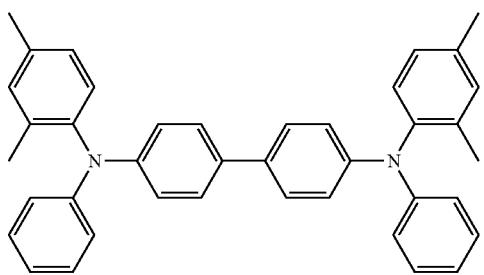
II-20
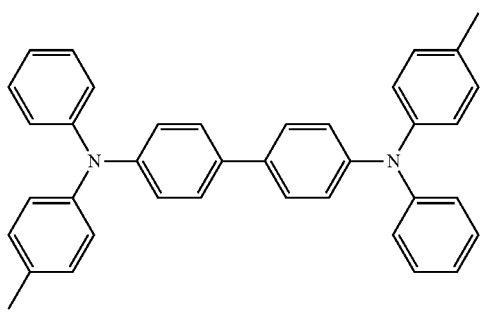
II-21
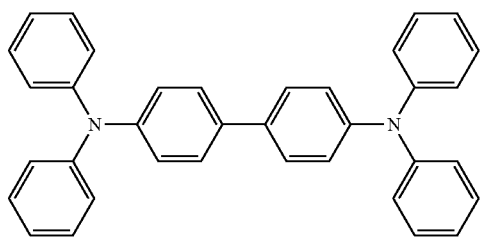

-continued
II-22
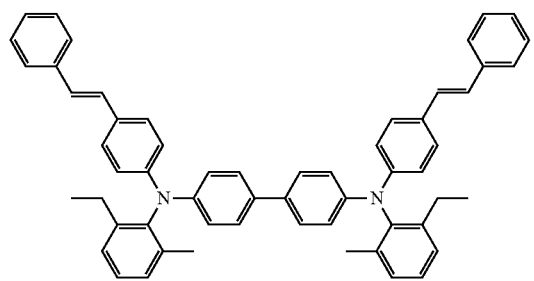
II-23
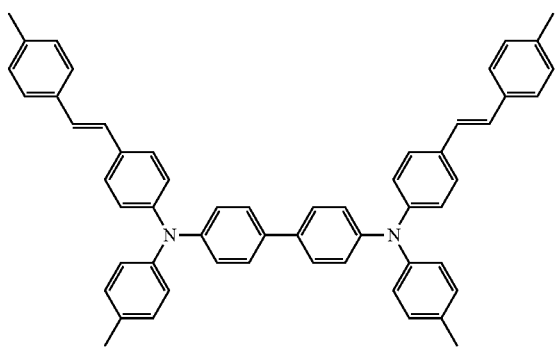
II-24
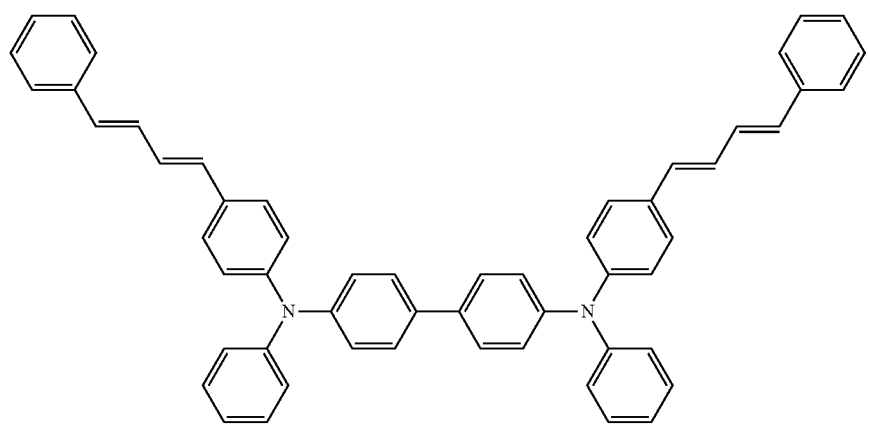
II-25
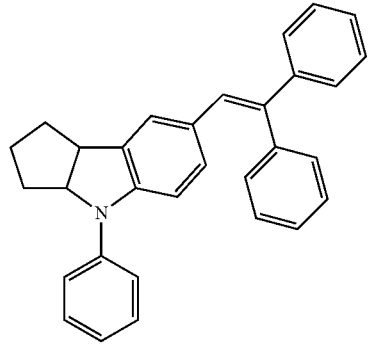
II-26
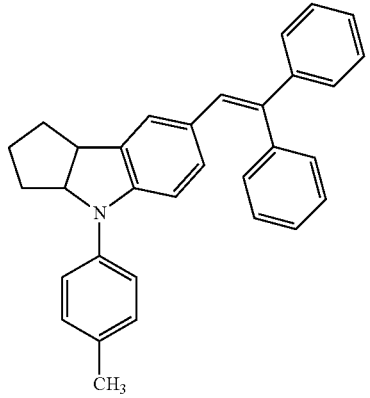
II-27
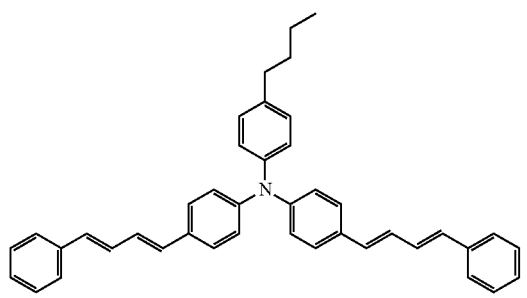
II-28
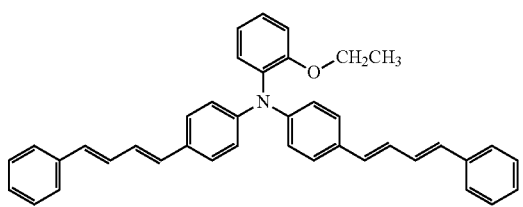

II-29
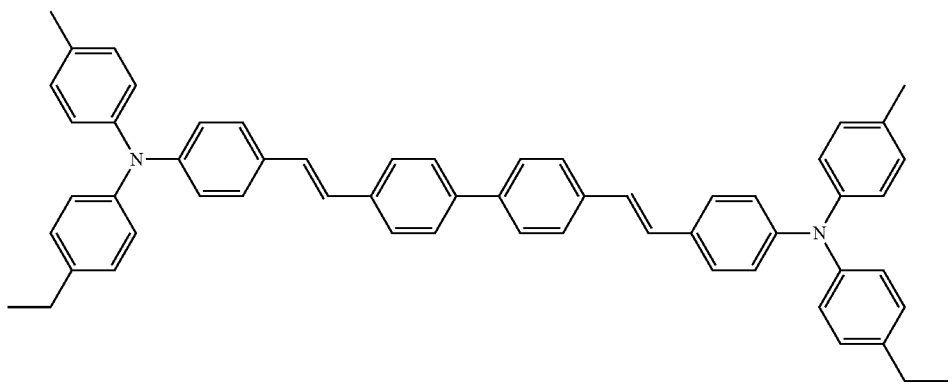
II-30
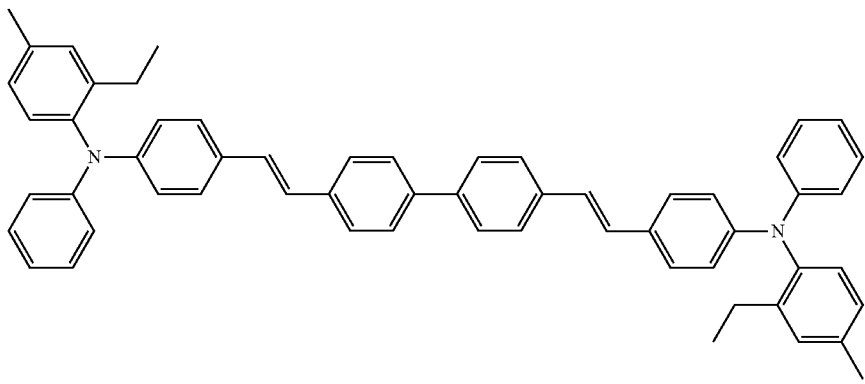
II-31
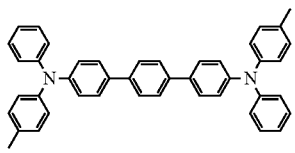
(1)
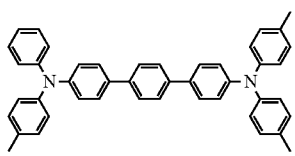
(2)
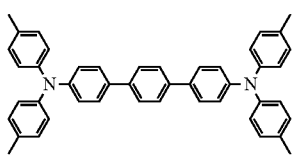
(3)
(1):(2):(3) = 1:2:1

-continued
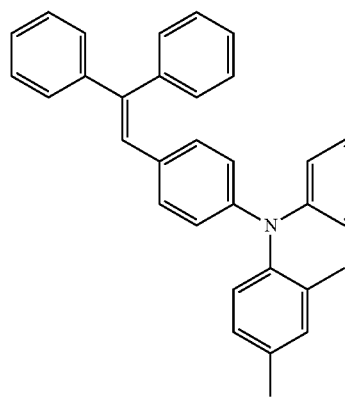 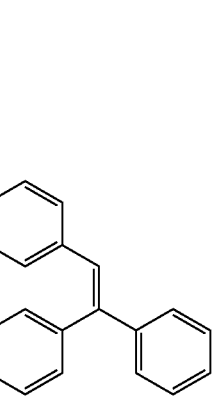
II-32
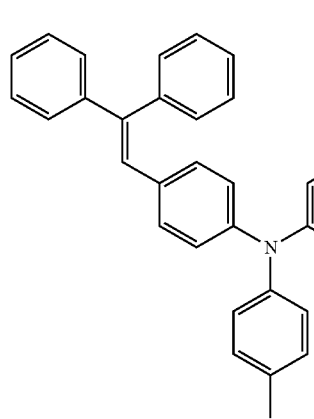 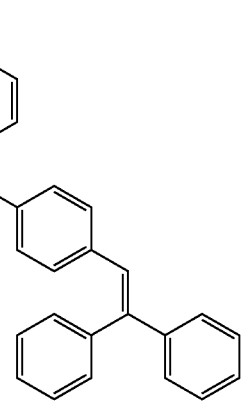
II-33

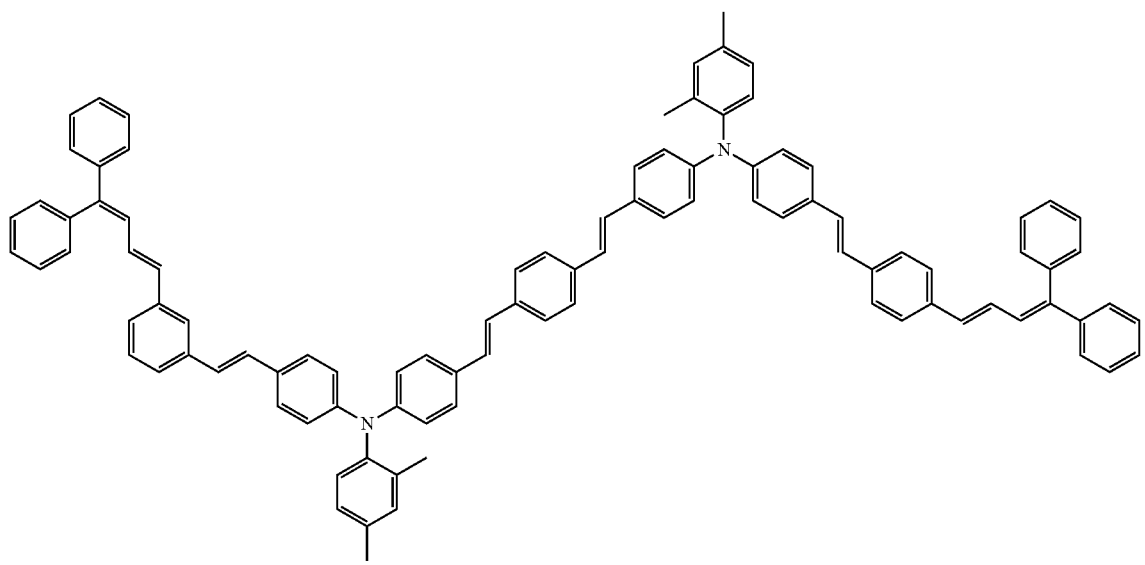
II-34
In this case, the above-described photosensitive layer may also contain an electron transport material as another charge transport material. Specific examples of such electron transport materials include, but are not limited to, the electron transport materials represented by the following structural formulae (III-1) to (III-20).
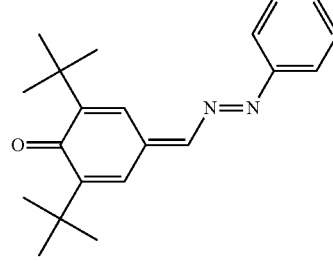
III-1
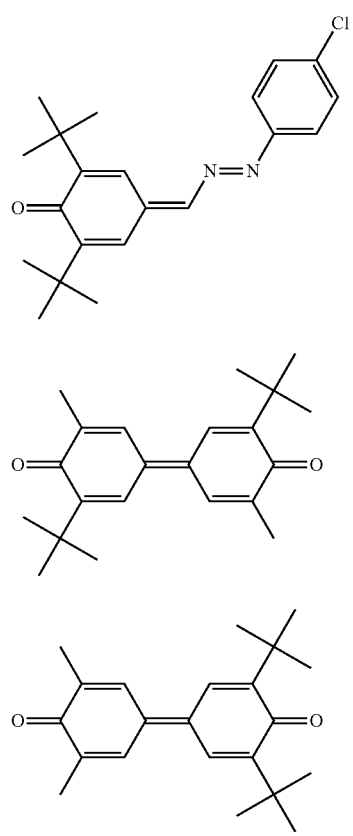
III-2
III-3
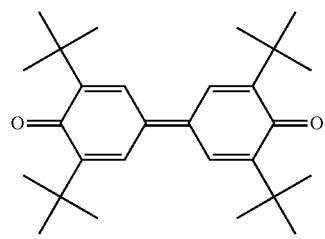
III-4
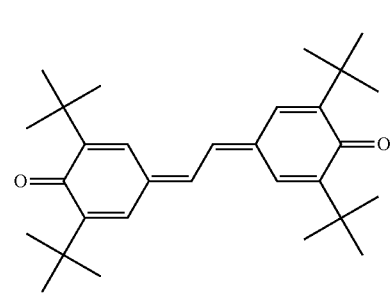
III-5
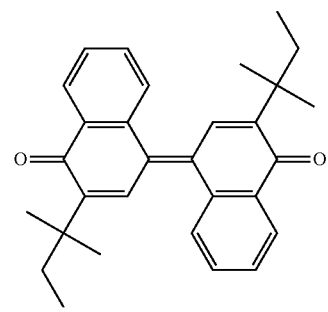
III-6

-continued
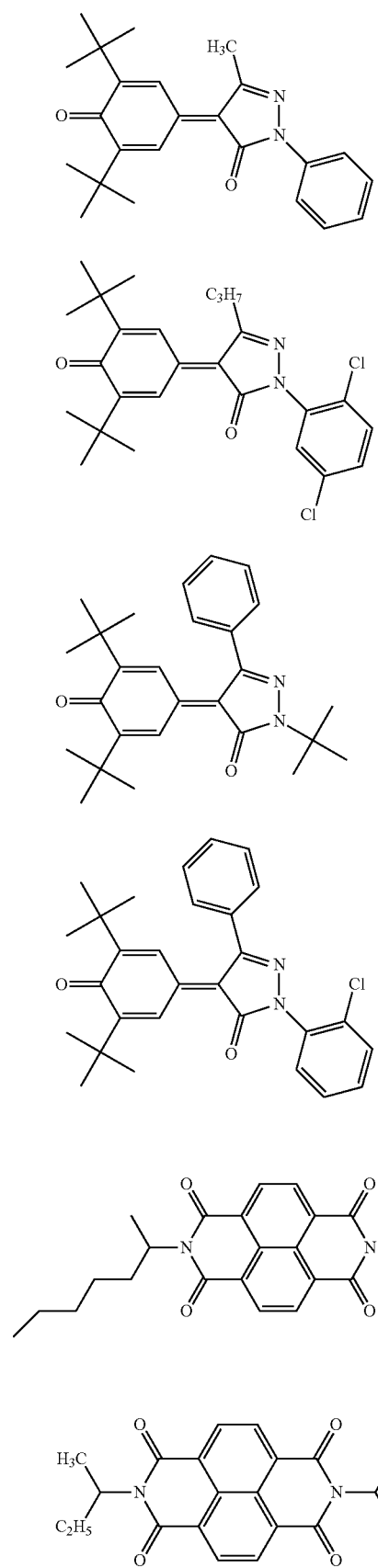
III-7
III-8
III-9
III-10
III-11
III-12
-continued
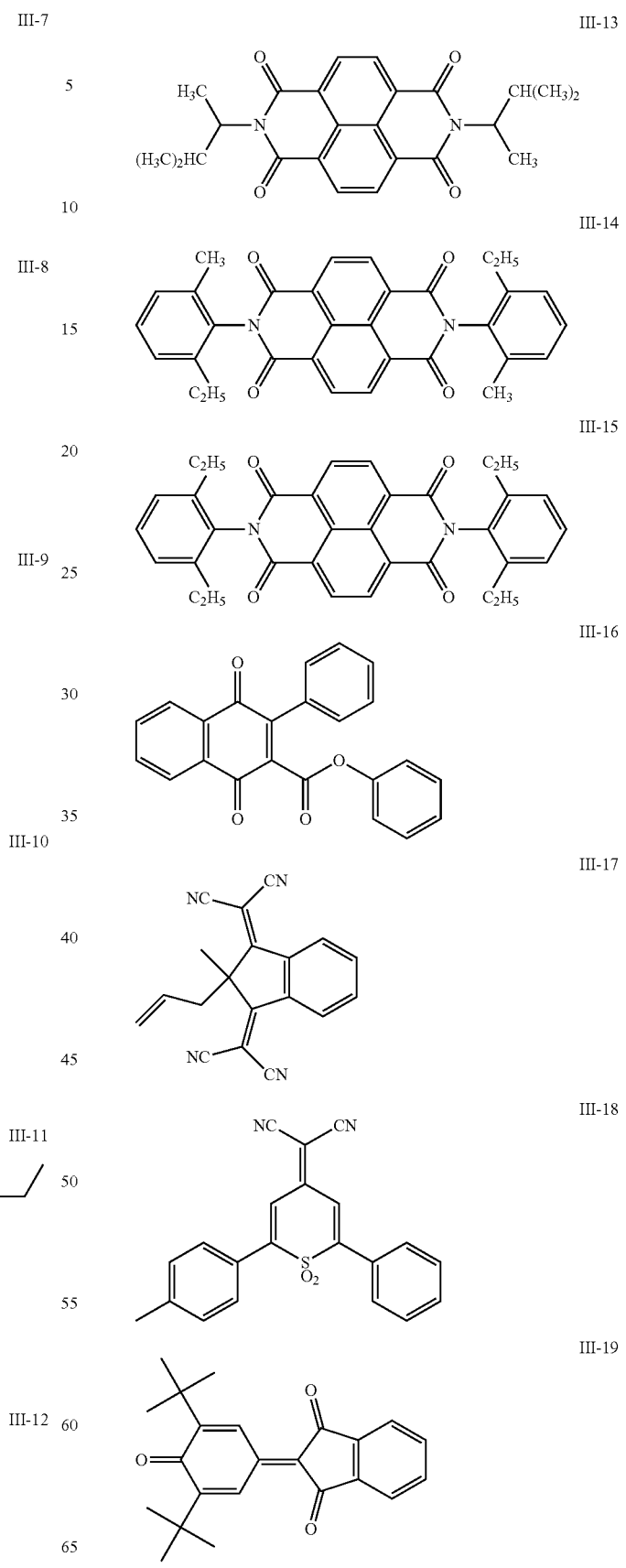
III-13
III-14
III-15
III-16
III-17
III-18
III-19

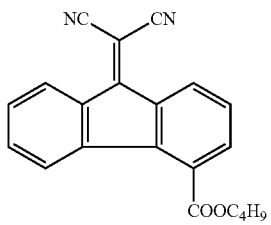

III-20

The above-described photosensitive layer preferably contains together with the above-described first hole transport material or the like, at least one of a curable resin having a cross-linked structure, such as an epoxy resin, a phenolic resin, and an acrylic resin, as a resin binder. When such a resin is used as a resin binder, the wear resistance is improved by a favorable reactivity of cross-linking during curing between the resin binder and the first hole transport material having the structure represented by the above-described general formula (1), and the electrical properties of a photoreceptor are improved by having a small number of unreacted moieties. Specific examples of epoxy resins include bisphenol epoxy resins (EPICLON 1050, 4050, 7050, 830 manufactured by DIC Corporation), phenolic novolac epoxy resins (EPICLON N775 manufactured by DIC Corporation), and cresol novolac epoxy resins (EPICLON N670 manufactured by DIC Corporation). Examples of phenolic resins include phenolic novolac (PHENOLITE TD-2131, TD-2090, VH-4150 manufactured by DIC Corporation). Examples of acrylic resins include multifunctional acrylates (A-TMPT (trimethylol propane triacrylate) and TMPT (trimethylol propane trimethacrylate) manufactured by Shin-Nakamura Chemical Co., Ltd. and Hitaloid 7975 manufactured by Hitachi Chemical Co., Ltd.), bisphenol (Hitaloid 7851 manufactured by Hitachi Chemical Co., Ltd.), and phenolic novolac (Hitaloid 7663 manufactured by Hitachi Chemical Co., Ltd.). Among these structures, a resin having an aromatic structure as a resin skeleton to be combined is more preferable for the above-described photosensitive layer.

Furthermore, in the above-described photosensitive layer, a curing agent or a curing accelerator is preferably used in combination to accelerate curing. Specific examples of such a curing agent or a curing accelerator include an imidazole compound, a tertiary amine, a phosphine, an acid anhydride, and an amide compound. More specific examples thereof include, but are not limited to, compounds represented by the following structural formulae (IV-1) to (IV-7). The content of a curing agent or a curing accelerator is, in terms of 100 parts by mass of the first hole transport material, usually from 0.01 to 30 parts by mass, and preferably from 0.1 to 10 parts by mass.

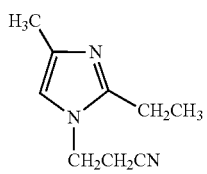

IV-1

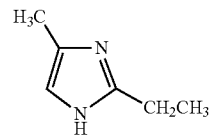

IV-2

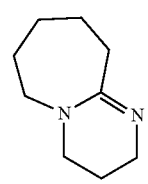

IV-3

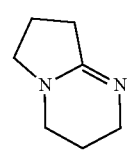

IV-4

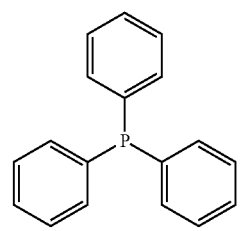

IV-5

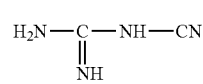

IV-6

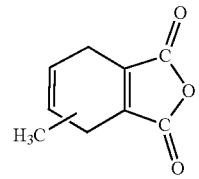

IV-7

Furthermore, it is also preferable to add a polymerization initiator to the above-described photosensitive layer to initiate curing. Examples of such a polymerization initiator include: an acetophenone-based or ketal-based photoinitiator such as dietoxyacetophenone, 2,2-dimethoxy-1,2-diphenylethanes-1-one, 1-hydroxy-cyclohexyl-phenyl-ketone, 4-(2-hydroxyethoxy)phenyl-(2-hydroxy-2-propyl)ketone, 2-benzyl-2-dimethylamino-1-(4-morpholinophenyl)butanone-1,2-hydroxy-2-methyl-1-phenyl propan-1-one, 2-methyl-2-morpholino(4-methylthiophenyl)propane-1-one, or 1-phenyl-1,2-propanedione-2-(o-ethoxycarbonyl) oxime; a benzoin ether-based photoinitiator such as benzoin, benzoin methyl ether, benzoin ethyl ether, benzoin isobutyl ether, or benzoin isopropyl ether; a benzophene-based photoinitiator such as benzophenone, 4-hydroxybenzophenone, methyl o-benzoyl benzoate, 2-benzoyl naphthalene, 4-benzoyl biphenyl, 4-benzoyl phenyl ether, benzophenone acrylate, or 1,4-benzoyl benzene; a thioxantone-based photoinitiator such as 2-isopropylthioxanthone, 2-chlorothioxanthone, 2,4-dimethylthioxanthone, 2,4-diethylthioxanthone, or 2,4-dichlorothioxanthone; and a titanocene-based photoinitiator such as bis(cyclopentadienyl)-dichloro-titanium, bis(cyclopentadienyl)-diphenyl-titanium, bis(cyclopentadienyl)-bis(2,3,4,5,6-pentafluorophenyl)titanium, or bis(cyclopentadienyl)-bis(2,6-difluoro-3-(pyrrole-1-yl)phenyl)titanium.

Examples of commercially available materials as polymerization initiators include ILGACURE 184, 651, 1173, and OXE04 manufactured by BASF Corporation.

In the above-described photosensitive layer, a compound having a thermal polymerization or photopolymerization accelerating effect can also be used singly or in combination with the above-described polymerization initiator. Examples of such a compound having a thermal polymerization or photopolymerization accelerating effect include triethanolamine, methyl diethanolamine, ethyl 4-dimethylaminobenzoate, isoamyl 4-dimethylaminobenzoate, ethyl benzoate (2-dimethylamino)ethyl benzoate, and 4,4'-dimethylaminobenzophenone. These may be used singly or may be used in a mixture of two or more kinds thereof.

The content of a polymerization initiator is, in terms of 100 parts by mass of the first hole transport material, usually from 0.01 to 30 parts by mass, and preferably from 0.1 to 10 parts by mass.

As described above, the first hole transport material represented by the general formula (1) forms a cross-linked structure by linking molecular chains of each other, but not all of the first hole transport materials need to react. Accordingly, the above-described photosensitive layer may contain, in addition to a cross-linked structure derived from the first hole transport material represented by the general formula (1), a non-essential and nonavoidableunreacted material of the first hole transport material represented by the general formula (1).

(Conductive Substrate)

The conductive substrate 1 serves as an electrode of a photoreceptor as well as a support for each layer constituting the photoreceptor, and may be in any of the shapes of a cylinder, plate, film, or the like. The material of the conductive substrate 1 can be a metal such as aluminum, stainless steel, or nickel, or a glass, a resin, or the like on the surface of which a conductive treatment has been applied, or the like.

(Undercoat Layer)

The undercoat layer 2 is composed of a layer consisting mainly of a resin or a metal oxide film such as anodized aluminum. The undercoat layer 2 is provided if necessary for the purpose of controlling the charge injection from the conductive substrate 1 to a photosensitive layer, covering defects on the surface of the conductive substrate 1, improving adhesion between the photosensitive layer and the conductive substrate 1, and the like. Examples of a resin material used for the undercoat layer 2 include an insulating polymer such as casein, polyvinyl alcohol, polyamide, melamine, or cellulose, and a conductive polymer such as polythiophene, polypyrrole, or polyaniline, and these resins can be used singly or mixed in combination as appropriate. These resins may be used with a metal oxide such as titanium dioxide or zinc oxide contained therein.

(Negatively Charged Layered Photoreceptor)

The photoreceptor according to an embodiment of the present invention may have any of the layer configurations illustrated in FIGS. 1A to 1C as long as the conditions for the above-described first hole transport material are satisfied. Suitably, the photoreceptor is a negatively charged layered electrophotographic photoreceptor, wherein the outermost surface layer is a charge transport layer 5. As described above, the negatively charged layered photoreceptor includes the charge generation layer 4 and the charge transport layer 5 in order from the conductive substrate 1 side.

In a negatively charged layered photoreceptor, the charge generation layer 4 is formed by a method such as applying a coating liquid in which particles of a charge-generating material are dispersed in a resin binder, which receives light and generates an electric charge. It is important for the charge generation layer 4 to have high charge generation efficiency and at the same time injection of the generated charge into the charge transport layer 5, and it is desirable that the charge generation layer 4 has little electric field dependence and favorable injection even in low electric fields.

As a charge generation material, phthalocyanine compounds such as X-type metal-free phthalocyanine, τ-type metal-free phthalocyanine, α-type titanyl phthalocyanine, β-type titanyl phthalocyanine, Y-type titanyl phthalocyanine, γ-type titanyl phthalocyanine, amorphous titanyl phthalocyanine, ε-type copper phthalocyanine, a variety of azo pigments, anthanthrone pigments, thiapyrillium pigments, perylene pigments, perinone pigments, squallium pigments, quinacridone pigments, and the like can be used singly or in combination as appropriate, and a suitable substance can be selected according to the optical wavelength range of an exposure light source used for image formation. In particular, a phthalocyanine compound can be suitably used. The charge generation layer 4 is mainly composed of a charge generation material, to which a charge transport material or the like can also be added.

As the resin binder of the charge generation layer 4, a polymer and copolymer of a polycarbonate resin, a polyester resin, a polyamide resin, a polyurethane resin, a vinyl chloride resin, a vinyl acetate resin, a phenoxy resin, a polyvinyl acetal resin, a polyvinyl butyral resin, a polystyrene resin, a polysulfone resin, a diallyl phthalate resin, and a methacrylic acid ester resin, and the like can be used in combination as appropriate.

The content of the charge generation material in the charge generation layer 4 is, based on the solids in the charge generation layer 4, suitably from 20 to 80% by mass, and more suitably from 30 to 70% by mass. The content of the resin binder in the charge generation layer 4 is, based on the solids in the charge generation layer 4, suitably from 20 to 80% by mass, and more suitably from 30 to 70% by mass. Since the charge generation layer 4 only needs to have a charge generation function, the film thickness of the charge generation layer 4 is generally 1 μm or less, and preferably 0.5 μm or less.

In the case of a negatively charged layered photoreceptor, the charge transport layer 5 is a photoreceptor layer containing the above-described first hole transport material and the like. In the negatively charged layered photoreceptor, the charge transport layer 5 is mainly composed of a hole transport material containing the above-described first hole transport material and a resin binder.

As described above, the charge transport layer 5 preferably contains, as a resin binder, at least one of a curable resin having a cross-linked structure, such as an epoxy resin, a phenolic resin or an acrylic resin. In this case, another resin may be mixed with the above-described resins. As such another resin, polyarylate resins, a variety of polycarbonate resins such as a bisphenol A-type, bisphenol Z-type, bisphenol C-type, or bisphenol A-type-biphenyl copolymer and a bisphenol Z-type-biphenyl copolymer, a polyphenylene resin, a polyester resin, a polyvinyl acetal resin, a polyvinyl butyral resin, a polyvinyl alcohol resin, a vinyl chloride resin, a vinyl acetate resin, a polyethylene resin, a polypropylene resin, a polyurethane resin, a melamine resin, a silicone resin, a polyamide resin, a polystyrene resin, a polyacetal resin, a polysulfone resin, polymers of methacrylate esters, and copolymers of these resins can be used.

These resins can be used singly or by mixing a plurality of kinds thereof. The same kind of resins with different molecular weights may also be used in a mixture. In this case, the mixing ratio of another resin in the total amount of the resin binder can usually be from 0 to 90% by mass, and more suitably from 10 to 70% by mass.

The mass average molecular weight of the above-described resins in the gel permeation chromatography (GPC) analysis of polystyrene equivalent is suitably from 5,000 to 250,000, and more suitably from 10,000 to 200,000.

Although the charge transport layer 5 needs to contain the above-described first hole transport material, another charge transport material can also be used in combination. As such a charge transport material, a variety of hydrazone compounds, a styryl compound, a diamine compound, a butadiene compound, an indole compound, an arylamine compound, and the like may be used singly or in combination as appropriate. Suitably, the above-described second hole transport material can be used, and specific examples thereof include, but are not limited to, those represented by the above-described structural formulae (II-1) to (II-34).

A curing agent or a curing accelerator, a polymerization initiator, or the like can be added to the charge transport layer 5, as described above.

The content of the first hole transport material represented by the above-described general formula (1) in the charge transport layer 5 in terms of the solids content of the charge transport layer 5 is from 20 to 99% by mass, and more suitably from 50 to 95% by mass. The content of the resin binder in the charge transport layer 5 in terms of the solids content of the charge transport layer 5 is preferably from 0 to 80% by mass, and more suitably from 5 to 50% by mass. When the charge transport layer 5 contains another hole transport material, preferably from 0 to 90% by mass, and more preferably from 10 to 80% by mass, of the content of the first hole transport material represented by the above-described general formula (1) can be replaced by the other hole transport material.

The film thickness of the charge transport layer 5 is preferably in the range of from 3 to 50 μm, and more preferably in the range of from 15 to 40 μm, in order to maintain an effective surface potential for practical purposes.

(Positively Charged Monolayer Photoreceptor)

In the case of a positively charged monolayer photoreceptor, the monolayer photosensitive layer 3 is a photosensitive layer containing the above-described first hole transport material and the like. In the positively charged monolayer photoreceptor, the monolayer photosensitive layer 3 is mainly composed of a hole transport material, including the above-described first hole transport material and an electron transport material (an acceptor compound), a charge generation material, and a resin binder.

As the hole transport material of the monolayer photosensitive layer 3, a first hole transport material represented by the above-described general formula (1) needs to be used. In addition to the above-described first hole transport material, another charge transport material, such as the above-described second hole transport material, can also be used. As such charge transport materials, for example, hydrazone compounds, pyrazoline compounds, pyrazolone compounds, oxadiazole compounds, oxazole compounds, arylamine compounds, benzidine compounds, stilbene compounds, styryl compounds, poly-N-vinyl carbazole, polysilane, and the like may be used singly or in combination as appropriate. Specific examples of such charge transport materials include, but are not limited to, those represented by the above-described structural formulae (II-1) to (II-34) as the above-described second hole transport material. As the hole transport material, one having an excellent ability to transport holes generated upon light irradiation as well as being suitable in combination with a charge generation material is preferable.

Examples of electron transport materials (acceptor compounds) used in the monolayer photosensitive layer 3 include amber anhydride, maleic anhydride, dibromo amber anhydride, phthalic anhydride, 3-nitro phthalic anhydride, 4-nitro phthalic anhydride, pyromellitic anhydride, pyromellitic acid, trimellitic acid, trimellitic anhydride, phthalimide, 4-nitrophthalimide, tetracyanoethylene, tetracyanoquinodimethane, chloranil, bromanil, o-nitrobenzoic acid, malononitrile, trinitrofluoresenone, trinitrothioxanthone, dinitrobenzene, dinitroanthracene, dinitroacridine, nitroanthraquinone, dinitroanthraquinone, a thiopyran compound, a quinone compound, a benzoquinone compound, a diphenoquinone compound, a naphthoquinone compound, an anthraquinone compound, a stilbenquinone compound, and an azoquinone compound. These electron transport materials can be used singly or in combination of two or more kinds thereof. Specific examples thereof include, but are not limited to, electron transport materials represented by the above-described structural formulae (III-1) to (III-20).

Examples of charge generation materials of the monolayer photosensitive layer 3 include phthalocyanine pigments, azo pigments, anthanthrone pigments, perylene pigments, perinone pigments, polycyclic quinone pigments, squallium pigments, thiapyrillium pigments, and quinacridone pigments. These charge generation materials can be used singly or in combination of two or more kinds thereof. In particular, disazo and tris-azo pigments are preferred as azo pigments, N,N'-bis(3,5-dimethylphenyl)-3,4:9,10-perylene bis(carboxyimide) is preferred as a perylene pigment, and metal-free phthalocyanine, copper phthalocyanine and titanyl phthalocyanine are preferred as phthalocyanine pigments. When X-type metal-free phthalocyanine, τ-type metal-free phthalocyanine, ε-type copper phthalocyanine, α-type titanyl phthalocyanine, β-type titanyl phthalocyanine, Y-type titanyl phthalocyanine, amorphous titanyl phthalocyanine, or a titanyl phthalocyanine having a maximum peak of 9.6° at a Bragg angle 2θ in a CuKα:X-ray diffraction spectrum as described in JPH08-209023A, U.S. Pat. Nos. 5,736,282A, 5,874,570A is used, an effect that is considerably improved in terms of sensitivity, durability, and image quality is obtained, which is preferred. Among the above, a phthalocyanine compound can be suitably used.

As described above, the monolayer photosensitive layer 3 preferably contains, as a resin binder, at least one of a curable resin having a cross-linked structure, such as an epoxy resin, a phenolic resin or an acrylic resin.

In this case, as in the case of the negatively charged layered photoreceptor, with the above-described resins, a variety of other polycarbonate resins such as a bisphenol A-type, bisphenol Z-type, or bisphenol A-type-biphenyl copolymer and a bisphenol Z-type-biphenyl copolymer, a polyphenylene resin, a polyester resin, a polyvinyl acetal resin, a polyvinyl butyral resin, a polyvinyl alcohol resin, a vinyl chloride resin, a vinyl acetate resin, a polyethylene resin, a polypropylene resin, a polyurethane resin, a melamine resin, a silicone resin, a polyamide resin, a polystyrene resin, a polyacetal resin, a polyarylate resin, a polysulfone resin, polymers of methacrylate esters, and copolymers of these resins can be used. The same kind of resins with different molecular weights may also be used in a mixture.

A curing agent or a curing accelerator, a polymerization initiator or the like can be added to the monolayer photosensitive layer 3, as described above.

The content of the first hole transport material represented by the above-described general formula (1) in the monolayer photosensitive layer 3, in terms of the solids content of the monolayer photosensitive layer 3, is preferably from 1 to 60% by mass, and more suitably from 2 to 30% by mass. The content of the other hole transport material in the monolayer photosensitive layer 3, in terms of the solids content of the monolayer photosensitive layer 3, excluding the first hole transport material represented by the general formula (1) above, is suitably from 3 to 50% by mass, and more suitably from 5 to 40% by mass. The content of the electron transport material in the monolayer photosensitive layer 3, in terms of the solids content of the monolayer photosensitive layer 3, is suitably from 1 to 50% by mass, and more suitably from 5 to 40% by mass. The content of the charge generating material in the monolayer photosensitive layer 3, in terms of the solids content of the monolayer photosensitive layer 3, is suitably from 0.1 to 20% by mass, and more suitably from 0.5 to 10% by mass. The content of the resin binder in the monolayer photosensitive layer 3, in terms of the solids content of the monolayer photosensitive layer 3 excluding the first hole transport material represented by the above-described general formula (1), is suitably from 0 to 80% by mass, and more suitably from 20 to 50% by mass.

The film thickness of the monolayer photosensitive layer 3 is preferably in the range of from 3 to 100 μm, and the range of 5 to 40 μm is more preferable in order to maintain an effective surface potential for practical purposes.

(Positively Charged Layered Photoreceptor)

As described above, the positively charged layered photoreceptor includes a charge transport layer 5 and a charge generation layer 4 in order from the conductive base 1 side. In the case of the positively charged layered photoreceptor, the charge generation layer 4 is the outermost layer and is a photosensitive layer containing a first hole transport material represented by the above-described general formula (1). In the positively charged layered photoreceptor, the charge transport layer 5 is mainly composed of a hole transport material and a resin binder. As such a hole transport material and a resin binder, the same materials as those listed for the charge transport layer 5 of the negatively charged layered photoreceptor, including the first hole transport material represented by the above-described general formula (1), can be used. The content of each material and the film thickness of the charge transport layer 5 can also be the same as for the negatively charged layered photoreceptor.

The charge generation layer 4 provided on the charge transport layer 5 is mainly composed of a charge generation material, a hole transport material including a first hole transport material represented by the above-described general formula (1), an electron transport material (an acceptor compound), and a resin binder. For the charge generation material, the hole transport material, the electron transport material, and the resin binder, the same materials as those listed for the monolayer photosensitive layer 3 of the monolayer photoreceptor can be used. The content of each material and the film thickness of the charge generation layer 4 can be the same as for the monolayer photosensitive layer 3 of the monolayer photoreceptor.

Here, a leveling agent such as a silicone oil or a fluorinated oil can be contained in the photosensitive layer of either a layered photoreceptor or a monolayer photoreceptor for the purpose of improving the leveling property of the formed film and providing lubricity. Furthermore, a plurality of kinds of inorganic oxides can be contained for the purpose of adjusting the film hardness, reducing the coefficient of friction, and providing lubricity. A metal oxide such as silica, titanium oxide, zinc oxide, calcium oxide, alumina, or zirconium oxide, a metal sulfate salt such as barium sulfate, or calcium sulfate, a fine particle of a metal nitride such as silicon nitride, or aluminum nitride, or a fluorine resin particle such as a tetrafluoroethylene resin, or a fluorine comb type graft polymerization resin may be contained. Still further, other known additives may be contained as necessary to the extent that the electrophotographic characteristics are not substantially impaired.

Antidegradation inhibitors such as antioxidants and photo stabilizers can be contained in a photosensitive layer for the purpose of improving environmental resistance and stability against harmful light. Examples of compounds used for such purposes include chromanol derivatives and esterified compounds such as tocopherols, polyaryl alkane compounds, hydroquinone derivatives, etherified compounds, dietherified compounds, benzophenone derivatives, benzotriazole derivatives, thioether compounds, phenylenediamine derivatives, phosphonic acid esters, phosphonic esters, phenolic compounds, hindered phenolic compounds, linear amine compounds, cyclic amine compounds, and hindered amine compounds.

(Method of Manufacturing Photoreceptor)

The manufacturing method of an embodiment of the present invention includes a step of forming a photosensitive layer by the dip coating method using a coating liquid containing the above-described first hole transport material in producing the above-described photoreceptor. By using the dip coating method, a photoreceptor having a favorable appearance quality and stable electrical properties can be produced while ensuring low cost and high productivity. There is no particular limitation in producing a photoreceptor except for using a dip coating method, and the method can be performed in accordance with a usual method. The manufacturing method may further include a step of preparing a conductive substrate, and when the photoreceptor is provided with a layered photosensitive layer, the manufacturing method may also include a step of dipping coating a charge generation layer and a charge transport layer on the conductive substrate in an appropriate order.

Specifically, for example, in the case of a negatively charged layered photoreceptor, first, any charge generation material is dissolved and dispersed in a solvent together with any resin binder or the like to prepare a coating liquid for forming a charge generation layer, and then the coating liquid for a charge generation layer is coated and dried on the outer periphery of the conductive substrate via an undercoat layer, as desired, to form a charge generation layer. Next, the above-described first hole transport material, any resin binder, any electron transport material, a variety of additives, and the like are dissolved in a solvent to prepare a coating liquid for forming a charge transport layer, and the coating liquid for a charge transport layer is coated and dried on the above-described charge generation layer to form a charge transport layer, thereby producing a photoreceptor. Here, the type of solvent, coating conditions, drying conditions, and the like used for preparing a coating liquid can be selected as appropriate in accordance with a usual method, and is not particularly restricted.

(Electrophotographic Device)

An electrophotographic device in accordance with an embodiment of the present invention comprises the aforementioned photoreceptor, and the desired effect can be obtained by applying the apparatus to various machine processes. Specifically, a sufficient effect can be obtained in a charging process such as a contact charging system using a charging member such as a roller or a brush, a non-contact charging system using a colotron, a scolotron, or the like, and a development process such as a contact development system and a non-contact development system using a non-magnetic one-component, magnetic one-component, two-component, or the like development system. In particular, an electrophotographic device is useful when the device is provided with a charging process of a contact charging system in which a charging member is charged by bringing the charging member into contact with a photoconductor, in that wear due to contact of the charging member can be controlled.

Figure 2:
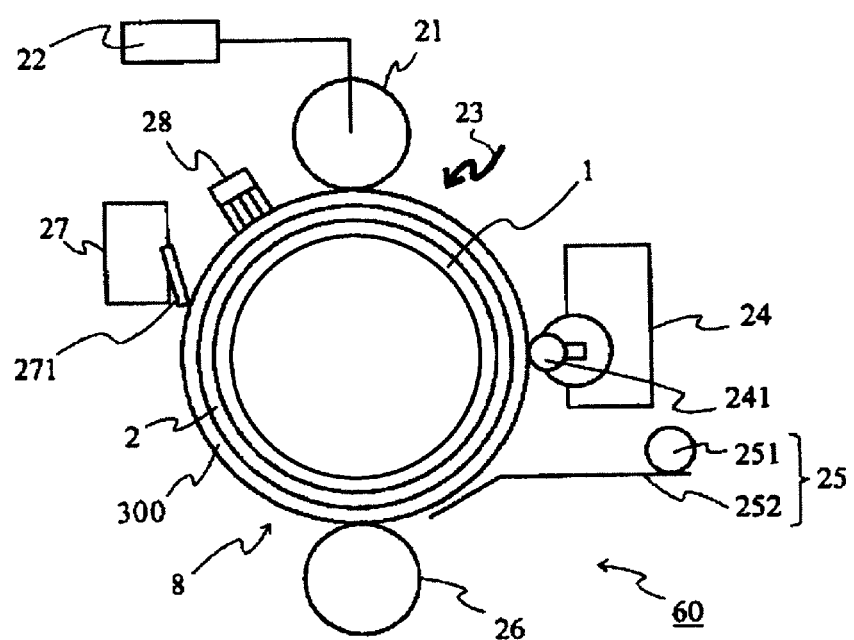
FIG. 2 is a schematic configuration view illustrating an example of an electrophotographic device according to an embodiment of the present invention.

FIG. 2 illustrates a schematic configuration diagram of one example of an electrophotographic device according to an embodiment of the present invention. An electrophotographic device 60 illustrated includes a photoreceptor 8 according to an embodiment of the present invention, including a conductive substrate 1, an undercoat layer 2 and a photosensitive layer 300 coated on the outer periphery thereof. The electrophotographic device 60 includes a charging member 21 arranged on the outer periphery of the photoreceptor 8, a high-voltage power supply 22 for supplying an applied voltage to the charging member 21, an image exposure member 23, a developer 24 with a developing roller 241, a paper feed member 25 with a paper feed roller 251 and a paper feed guide 252, and a transfer charger (direct charging type) 26. The electrophotographic device 60 may further include a cleaning device 27 with a cleaning blade 271 and a static eliminating member 28. The electrophotographic device 60 may be a color printer.

EXAMPLES

Specific embodiments of the present invention will be described in more detail by means of Examples. The present invention is not limited by Examples unless the gist of the present invention is exceeded.

(Production of Negatively Charged Layered Photoreceptor)

Example 1

Three parts by mass of alcohol-soluble nylon (manufactured by Toray Industries, Inc., trade name "CM8000") and 7 parts by mass of amino silane-treated titanium dioxide microparticles were dissolved and dispersed in 90 parts by mass of methanol to prepare a coating liquid 1. This coating liquid 1 was dip-coated as an undercoat layer onto the outer periphery of an aluminum cylinder with an outer diameter of 30 mm as a conductive substrate 1, and dried at a temperature of 100° C. for 30 minutes to form an undercoat layer 2 with a film thickness of 3 μm.

One part by mass of Y-type titanyl phthalocyanine as a charge generation material and 1.5 parts by mass of polyvinyl butyral resin (manufactured by Sekisui Chemical Co., Ltd., trade name "SREK BM-1") as a resin binder were dissolved and dispersed in 60 parts by mass of dichloromethane to prepare a coating liquid 2. The coating liquid 2 was dipped and coated on the above-described undercoat layer 2. A charge generation layer 4 with a film thickness of 0.3 μm was formed by drying at a temperature of 80° C. for 30 minutes.

70 parts by mass of a compound represented by the above-described structural formula (1)-1-2 as a first hole transport material (CTM), 30 parts by mass of a phenolic novolac epoxy resin (manufactured by DIC Corporation, EPICLON N775) which is a curable resin as a resin binder, and 3 parts by mass of a compound represented by the above-described structural formula IV-1 as a curing accelerator, were dissolved in 100 parts by mass of acetone to prepare a coating liquid 3.

This coating liquid 3 was dip-coated on the above-described charge generation layer 4, and was allowed to react to cure by increasing the temperature in stages in the order of first at 65° C. for 30 minutes, then at 120° C. for 60 minutes, and then at 150° C. for 3 hours, to form a charge transport layer 5 with a film thickness of 20 μm, to produce a negatively charged layered photoreceptor.

Example 2

A negatively charged layered photoreceptor was prepared in the same manner as in Example 1, except that the first hole transport material used in Example 1 was set at 80 parts by mass and the curable resin was set at 20 parts by mass.

Example 3

A negatively charged layered photoreceptor was prepared in the same manner as in Example 1, except that the first hole transport material used in Example 1 was set at 90 parts by mass and the curable resin was set at 10 parts by mass.

Reference Example 1

A negatively charged layered photoreceptor was prepared in the same manner as in Example 1, except that the first hole transport material used in Example 1 was set at 100 parts by mass and the curable resin was set at 0 parts by mass.

Example 4

A negatively charged layered photoreceptor was prepared in the same manner as in Example 2, except that the first hole transport material used in Example 2 was set at 70 parts by mass and furthermore 10 parts by mass of the second hole transport material represented by the above-described structural formula II-5 was added.

Example 5

A negatively charged layered photoreceptor was prepared in the same manner as in Example 4, except that the second hole transport material used in Example 4 was changed to one represented by the above-described structural formula II-6.

Example 6

A negatively charged layered photoreceptor was prepared in the same manner as in Example 4, except that the second hole transport material used in Example 4 was changed to one represented by the above-described structural formula II-7.

Example 7

A negatively charged layered photoreceptor was prepared in the same manner as in Example 4, except that the second hole transport material used in Example 4 was changed to one represented by the above-described structural formula II-32.

Example 8

A negatively charged layered photoreceptor was prepared in the same manner as in Example 4, except that the second hole transport material used in Example 4 was changed to one represented by the above-described structural formula II-33.

Example 9

A negatively charged layered photoreceptor was prepared in the same manner as in Example 4, except that the second hole transport material used in Example 4 was changed to one represented by the above-described structure formula II-34.

Example 10

A negatively charged layered photoreceptor was prepared in the same manner as in Example 1, except that the curable resin used in Example 1 was set at 20 parts by mass, 10 parts by mass of a resin having a recurring unit represented by the following structural formula V was added, and tetrahydrofuran (THF) was used as a solvent:

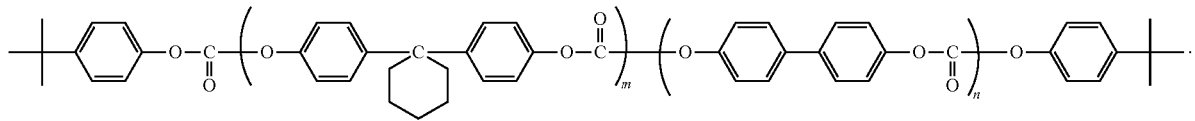

m:n = 60:40

Example 11

A negatively charged layered photoreceptor was prepared in the same manner as in Example 2, except that the first hole transport material used in Example 2 was changed to the one represented by the above-described structural formula (1)-1-5.

Example 12

A negatively charged layered photoreceptor was prepared in the same manner as in Example 2, except that the first hole transport material used in Example 2 was changed to the one represented by the above-described structural formula (1)-1-7.

Example 13

A negatively charged layered photoreceptor was prepared in the same manner as in Example 2, except that the first hole transport material used in Example 2 was changed to the one represented by the above-described structural formula (1)-1-11.

Example 14

A negatively charged layered photoreceptor was prepared in the same manner as in Example 2, except that the first hole transport material used in Example 2 was changed to the one represented by the above-described structural formula (1)-1-13.

Example 15

A negatively charged layered photoreceptor was prepared in the same manner as in Example 2, except that the first hole transport material used in Example 2 was changed to the one represented by the above-described structural formula (1)-5-1.

Example 16

A negatively charged layered photoreceptor was prepared in the same manner as in Example 2, except that the first hole transport material used in Example 2 was changed to the one represented by the above-described structural formula (1)-5-2.

Example 17

A negatively charged layered photoreceptor was prepared in the same manner as in Example 2, except that the first hole transport material used in Example 2 was changed to one represented by the above-described structural formula (1)-2-2, the resin binder was changed to a phenolic novolac acrylic resin, which is a curable resin, and the compound represented by the above-described structural formula IV-1 as a curing accelerator was changed to IrgaCure OXE04 as a polymerization initiator, and the curing method of the charge transport layer 5 was changed to light irradiation.

Specifically, first, 80 parts by mass of a compound represented by the above-described structural formula (1)-2-2 as the first hole transport material, 20 parts by mass of a phenolic novolac acrylic resin (Hitaroid 7663 manufactured by Hitachi Chemical Co., Ltd.), which is a curable resin as a resin binder, and 3 parts by mass of Irganox OXE04 (manufactured by BASF) as a curing catalyst were dissolved in 100 parts by mass of acetone to prepare a coating liquid 3.

This coating liquid 3 was dip-coated on a charge generation layer 4 produced in the same manner as in Example 1, dried at a temperature of 65° C. for 60 minutes, and then UV irradiation (500 mW/cm$^2$, 365 nm standard) was carried out for 5 minutes to cure to form a charge transport layer 5 having a thickness of 20 μm to prepare a negatively charged layered photoreceptor.

Example 18

A negatively charged layered photoreceptor was prepared in the same manner as in Example 17, except that the phenolic novolac acrylic resin used in Example 17 was set at 10 parts by mass and 10 parts by mass of a second hole transport material represented by the above-described structural formula II-5 was added.

Example 19

A negatively charged layered photoreceptor was prepared in the same manner as in Example 18, except that the second hole transport material used in Example 18 was changed to one represented by the above-described structural formula II-32.

Example 20

A negatively charged layered photoreceptor was prepared in the same manner as in Example 17, except that the first hole transport material used in Example 17 was changed to one represented by the above-described structural formula (1)-2-11.

Example 21

A negatively charged layered photoreceptor was prepared in the same manner as in Example 17, except that the first hole transport material used in Example 17 was changed to one represented by the above-described structural formula (1)-3-1.

Example 22

A negatively charged layered photoreceptor was prepared in the same manner as in Example 17, except that the first hole transport material used in Example 17 was changed to one represented by the above-described structural formula (1)-4-1.

(Production of Positively Charged Layered Photoreceptor)

Example 23

As the conductive substrate, a 0.75 mm thick aluminum tube with a diameter of 30 mm×a length of 252.6 mm and a surface roughness (Rmax) of 0.2 μm was used.
(Charge Transport Layer)
60 parts by mass of a compound represented by the above-described structural formula (1)-1-2 as a hole transport material (CTM), 40 parts by mass of a phenolic novolac epoxy resin (manufactured by DIC Corporation, EPICLON N775) which is a curable resin as a resin binder, and 3 parts by mass of a compound represented by the above-described structural formula IV-1 as a curing accelerator, were dissolved in 100 parts by mass of acetone to prepare a coating liquid. This coating liquid was dip-coated on the outer periphery of the above-described conductive substrate, and was cured by increasing the temperature in stages in the order of first at 65° C. for 30 minutes, then at 120° C. for 60 minutes, and then at 150° C. for 3 hours, to form a charge transport layer 5 with a film thickness of 15 μm.
(Charge Generation Layer)
Twenty parts by mass of a compound represented by the above-described structural formula (1)-1-2 as a hole transport material, 80 parts by mass of a compound represented by the structural formula III-11 as an electron transport material, 40 parts by mass of a phenolic novolac epoxy resin (manufactured by DIC Corporation, EPICLON N775), which is a curable resin as a resin binder, 60 parts by mass of a polycarbonate resin having a recurring unit represented by the above-described structural formula V, 3 parts by mass of a compound represented by the above-described structural formula IV-1 as a curing accelerator, 0.3 parts by mass of a silicone oil (KF-54, manufactured by Shin-Etsu Polymer Co., Ltd.), and 0.5 parts by mass of dibutyl hydroxytoluene (BHT) were dissolved in 800 parts by mass of THF, 2 parts by mass of Y-type titanyl phthalocyanine as a charge generation material was added, and then dispersed by sand grind mill to prepare the coating liquid. This coating liquid was applied on the above-described charge transport layer, and cured by increasing the temperature in stages, first at 65° C. for 30 minutes, then at 120° C. for 60 minutes, and then at 150° C. for 3 hours, to form a charge generation layer 4 with a film thickness of 15 μm, to produce a positively charged layered photoreceptor with a film thickness of 30 μm.

Example 24

For the charge transport layer 5, 60 parts by mass of a compound represented by the above-described structural formula II-5 as a hole transport material (CTM) and 40 parts by mass of a resin having a recurring unit represented by the above-described structural formula V as a resin binder were dissolved in 600 parts by mass of THF to prepare a coating liquid. This coating liquid was dip-coated on the outer periphery of the same conductive substrate as used in Example 23 and dried at 120° C. for 60 minutes to form a charge transport layer 5 with a film thickness of 15 μm. Other than that, a positively charged layered photoreceptor was prepared in the same manner as in Example 23.

Example 25

A positively charged layered photoreceptor was prepared in the same manner as in Example 23, except that, for the charge generation layer 4, a compound represented by the above-described structural formula (1)-1-11 was used as a hole transport material (CTM).

Example 26

A positively charged layered photoreceptor was prepared in the same manner as in Example 23, except that, for the charge generation layer 4, a compound represented by the structural formula III-11 as the electron transport material used in Example 23 was set at 40 parts by mass, and further, 40 parts by mass of a compound represented by the structural formula III-1 as an electron transport material was added.

Example 27

A positively charged layered photoreceptor was prepared in the same manner as in Example 24, except that, for the charge generation layer 4, the first hole transport material used in Example 24 was set at 15 parts by mass, and furthermore, 5 parts by mass of the second hole transport material represented by the above-described structural formula II-5 was added.

(Production of Positively Charged Monolayer Photoreceptor)

Example 28

(Photosensitive Layer)
60 parts by mass of a compound represented by the above-described structural formula (1)-1-2 as a hole transport material (CTM), 30 parts by mass of a phenolic novolac epoxy resin (manufactured by DIC Corporation, EPICLON N775) which is a curable resin as a resin binder, 40 parts by mass of a compound represented by the structural formula III-1 as an electron transport material, 3 parts by mass of a compound represented by the above-described structural formula IV-1 as a curing accelerator, and 60 parts by mass of a polycarbonate resin having a recurring unit represented by the structural formula V as a resin binder were dissolved in 600 parts by mass of THF, 2 parts by mass of metal-free phthalocyanine as a charge generation material was added, and then a mixture was dispersed by a sand grind mill to prepare a coating liquid. This coating liquid was dip-coated on the outer periphery of a conductive substrate as in Example 23, and cured by increasing the temperature in stages, first at 65° C. for 30 minutes, then at 120° C. for 60 minutes, and then at 150° C. for 3 hours, to form a monolayer photosensitive layer with a film thickness of 25 µm.

Comparative Example 1

A negatively charged layered photoreceptor was prepared in the same manner as in Example 2, except that the first hole transport material used in Example 2 was changed to one represented by the following structural formula VI-1:

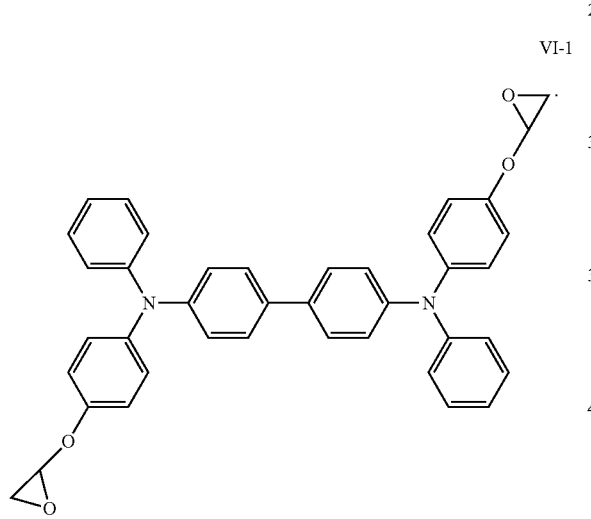

Comparative Example 2

A negatively charged layered photoreceptor was prepared in the same manner as in Reference Example 1, except that the first hole transport material used in Reference Example 1 was changed to one represented by the above-described structural formula VI-1.

Comparative Example 3

A negatively charged layered photoreceptor was prepared in the same manner as in Example 2, except that the first hole transport material used in Example 2 was changed to one represented by the following structural formula VI-2:

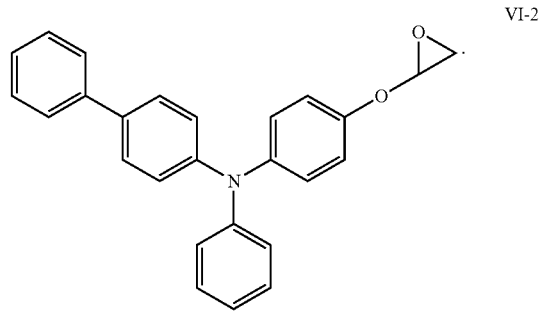 [SMILES: c1ccc(-c2ccc(N(c3ccccc3)c3ccc(OC4CO4)cc3)cc2)cc1]

Comparative Example 4

A negatively charged layered photoreceptor was prepared in the same manner as in Example 2, except that the first hole transport material used in Example 2 was changed to one represented by the following structural formula VI-3:

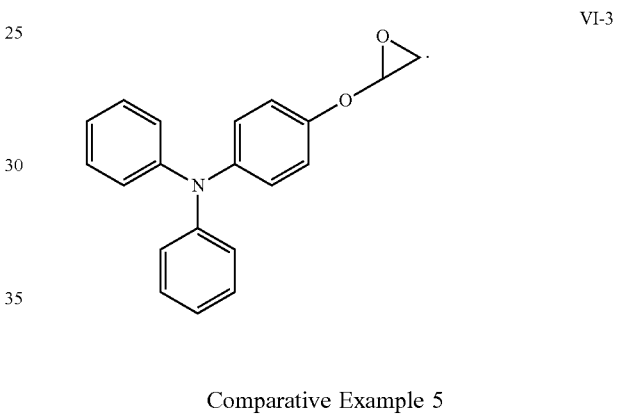

Comparative Example 5

A negatively charged layered photoreceptor was prepared in the same manner as in Example 4, except that the first hole transport material used in Example 4 was changed to one represented by the above-described structural formula VI-1.

Comparative Example 6

A positively charged layered photoreceptor was prepared in the same manner as in Example 23, except that, for the charge generation layer 4, the first hole transport material used in Example 23 was changed to one represented by the structural formula VI-1, and 100 parts by mass of acetone was used in place of 800 parts by mass of THF.

Comparative Example 7

A positively charged monolayer photoreceptor was prepared in the same manner as in Example 28, except that the first hole transport material used in Example 28 was changed to one represented by the structural formula VI-1.

<Evaluation of Photoreceptor>

The electrical properties of the photoreceptors prepared in Examples 1 to 28, Reference Example 1, and Comparative Examples 1 to 7 described above were evaluated using the following methods. The evaluation results are shown in Tables 6 and 7 below.

<Electrical Properties>

The electrical properties of the photoreceptors obtained in Examples and Comparative Examples were evaluated using a process simulator (CYNTHIA91) manufactured by Gentech Co., Ltd. by the following method.

For the photoreceptors of Examples 1 to 22, Reference Example 1, and Comparative Examples 1 to 5, the surface of the photoreceptors was charged to −650 V by corona discharge in a dark place at a temperature of 22° C. and 50% humidity, and the surface potential V0 immediately after charging was measured. Then, after leaving the photoreceptor in a dark place for 5 seconds, the surface potential V5 was measured, and the potential retention rate Vk5(%) after 5 seconds of charging was determined according to the following calculation formula (1):

$$Vk5=V5/V0\times100 \quad (1).$$

Next, exposure light of 1.0 μW/cm² at 780 nm obtained by splitting with a filter using a halogen lamp as a light source was exposed to the photoreceptor for 5 seconds from the point when the surface potential reached −600 V, and the amount of exposure required for light decay to reach a surface potential of −300 V was evaluated with a sensitivity of E1/2 (μJ/cm²).

For the photoreceptors of Examples 23 to 28 and Comparative Examples 6 to 7, the value of Vk5 and the amount of exposure from the surface potential of +600 V to +300 V were evaluated when the surface of the photoreceptor was charged to +650 V by corona discharge in a dark place and exposed in the same manner.

<Wear Resistance>

The photoreceptors prepared in Examples 1 to 22, Reference Example 1, and Comparative Examples 1 to 5 were installed in a two-component developing digital copier (manufactured by Canon Inc., image Runner color 2880), and the amount of film scraping (wear amount) before and after printing 10,000 sheets of the copier was evaluated.

The photoreceptors of Examples 23 to 28 and Comparative Examples 6 to 7 were incorporated into a commercially available 16-sheet color LED printer (HL-3040) manufactured by Brother Industries, Ltd. and printed up to 5,000 images with a print area ratio of 4% at 10-second intervals, and the amount of film scraping (wear amount) was evaluated.

<Contamination Resistance>
(Fatty Acid Resistance)

Under the same conditions as the above-described evaluation of wear resistance, a wiper (Bencot M-3II, manufactured by Asahi Kasei Fibers Corporation) cut into 10 mm squares and soaked with from 80 to 120 mg of triglyceride oleic acid (manufactured by Wako Pure Chemical Co., Ltd.) was brought into contact with the surface of the photoreceptors of Examples and Comparative Examples for 24 hours. The wiper was then removed and the photoreceptor surface was wiped off. An intermediate tone image of a 1on2off pattern was then printed to check for printing defects (white defect and black defect) in adhered areas. A case in which a streak was found on the image was indicated as o, and a case in which there was no streak was indicated as x.

TABLE 3

| | Film formation conditions for charge transport layer of negatively charged layered photoreceptor | | | | | | | | | | |
| | First hole transport material | | Curable resin | | Curing accelerator | | Other materials | | Solvent | | Curing |
| | Type | Amount | Type | Amount | Type | Amount | Type | Amount | Type | Amount | process |
| Example 1 | (1)-1-2 | 70 | N775 | 30 | IV-1 | 3 | — | — | Acetone | 100 | Heat |
| Example 2 | (1)-1-2 | 80 | N775 | 20 | IV-1 | 3 | — | — | Acetone | 100 | Heat |
| Example 3 | (1)-1-2 | 90 | N775 | 10 | IV-1 | 3 | — | — | Acetone | 100 | Heat |
| Reference Example 1 | (1)-1-2 | 100 | — | — | IV-1 | 3 | — | — | Acetone | 100 | Heat |
| Example 4 | (1)-1-2 | 70 | N775 | 20 | IV-1 | 3 | II-5 | 10 | Acetone | 100 | Heat |
| Example 5 | (1)-1-2 | 70 | N775 | 20 | IV-1 | 3 | II-6 | 10 | Acetone | 100 | Heat |
| Example 6 | (1)-1-2 | 70 | N775 | 20 | IV-1 | 3 | II-7 | 10 | Acetone | 100 | Heat |
| Example 7 | (1)-1-2 | 70 | N775 | 20 | IV-1 | 3 | II-32 | 10 | Acetone | 100 | Heat |
| Example 8 | (1)-1-2 | 70 | N775 | 20 | IV-1 | 3 | II-33 | 10 | Acetone | 100 | Heat |
| Example 9 | (1)-1-2 | 70 | N775 | 20 | IV-1 | 3 | II-34 | 10 | Acetone | 100 | Heat |
| Example 10 | (1)-1-2 | 70 | N775 | 20 | IV-1 | 3 | V | 10 | THF | 100 | Heat |
| Example 11 | (1)-1-5 | 80 | N775 | 20 | IV-1 | 3 | — | — | Acetone | 100 | Heat |
| Example 12 | (1)-1-7 | 80 | N775 | 20 | IV-1 | 3 | — | — | Acetone | 100 | Heat |
| Example 13 | (1)-1-11 | 80 | N775 | 20 | IV-1 | 3 | — | — | Acetone | 100 | Heat |
| Example 14 | (1)-1-13 | 80 | N775 | 20 | IV-1 | 3 | — | — | Acetone | 100 | Heat |
| Example 15 | (1)-5-1 | 80 | N775 | 20 | IV-1 | 3 | — | — | Acetone | 100 | Heat |
| Example 16 | (1)-5-2 | 80 | N775 | 20 | IV-1 | 3 | — | — | Acetone | 100 | Heat |
| Example 17 | (1)-2-2 | 80 | 7663 | 20 | OXE04 | 3 | — | — | Acetone | 100 | UV |
| Example 18 | (1)-2-2 | 80 | 7663 | 10 | OXE04 | 3 | II-5 | 10 | Acetone | 100 | UV |
| Example 19 | (1)-2-2 | 80 | 7663 | 10 | OXE04 | 3 | II-32 | 10 | Acetone | 100 | UV |
| Example 20 | (1)-2-11 | 80 | 7663 | 20 | OXE04 | 3 | — | — | Acetone | 100 | UV |
| Example 21 | (1)-3-1 | 80 | 7663 | 20 | OXE04 | 3 | — | — | Acetone | 100 | UV |
| Example 22 | (1)-4-1 | 80 | 7663 | 20 | OXE04 | 3 | — | — | Acetone | 100 | UV |
| Comparative Example 1 | V1-1 | 80 | N775 | 20 | IV-1 | 3 | — | — | Acetone | 100 | Heat |
| Comparative Example 2 | V1-1 | 100 | — | — | IV-1 | 3 | — | — | Acetone | 100 | Heat |
| Comparative Example 3 | V1-2 | 80 | N775 | 20 | IV-1 | 3 | — | — | Acetone | 100 | Heat |
| Comparative Example 4 | VI-3 | 80 | N775 | 20 | IV-1 | 3 | — | — | Acetone | 100 | Heat |
| Comparative Example 5 | V1-1 | 70 | N775 | 20 | IV-1 | 3 | II-5 | 10 | Acetone | 100 | Heat |

TABLE 4

Film formation conditions for charge generation layer of a positively charged layered photoreceptor

| | First hole transport material | | Curable resin | | Electron transport material | | Curing accelerator | | Other materials | | Solvent | | Curing |
|---|---|---|---|---|---|---|---|---|---|---|---|---|---|
| | Type | Amount | Type | Amount | Type | Amount | Type | Amount | Type | Amount | Type | Amount | process |
| Example 23 | (1)-1-2 | 20 | N775 | 40 | III-11 | 80 | IV-1 | 3 | V | 60 | THF | 800 | Heat |
| Example 24 | (1)-1-2 | 20 | N775 | 40 | III-11 | 80 | IV-1 | 3 | V | 60 | THF | 800 | Heat |
| Example 25 | (1)-1-11 | 20 | N775 | 40 | III-11 | 80 | IV-1 | 3 | V | 60 | THF | 800 | Heat |
| Example 26 | (1)-1-2 | 20 | N775 | 40 | III-1<br>III-11 | 40<br>40 | IV-1 | 3 | V | 60 | THF | 800 | Heat |
| Example 27 | (1)-1-2 | 15 | N775 | 40 | III-11 | 80 | IV-1 | 3 | V<br>II-5 | 60<br>5 | THF | 800 | Heat |
| Comparative Example 6 | VI-1 | 20 | N775 | 40 | III-11 | 80 | IV-1 | 3 | V | 60 | Acetone | 100 | Heat |

*) Some of the components are shown in excerpts.

TABLE 5

Film formation conditions for photosensitive layer of monolayer photoreceptor

| | First hole transport material | | Curable resin | | Electron transport material | | Curing accelerator | | Other material | | Solvent | | Curing |
|---|---|---|---|---|---|---|---|---|---|---|---|---|---|
| | Type | Amount | Type | Amount | Type | Amount | Type | Amount | Type | Amount | Type | Amount | process |
| Example 28 | (1)-1-2 | 60 | N775 | 30 | III-1 | 40 | IV-1 | 3 | V | 60 | THF | 600 | Heat |
| Comparative Example 7 | VI-1 | 60 | N775 | 30 | III-1 | 40 | IV-1 | 3 | V | 60 | THF | 600 | Heat |

*) Some of the components are shown in excerpts.

TABLE 6

Electrical properties

| | Retention rate Vk 5 (%) | Sensitivity 1/2 (μJ/cm$^2$) | Wear amount (μm) | Contamination resistance |
|---|---|---|---|---|
| Example 1 | 92.3 | 0.16 | 2.1 | ○ |
| Example 2 | 93.7 | 0.15 | 2.2 | ○ |
| Example 3 | 93.3 | 0.14 | 2.4 | ○ |
| Reference Example 1 | 92.8 | 0.14 | 2.8 | ○ |
| Example 4 | 92.2 | 0.16 | 2.2 | ○ |
| Example 5 | 94.1 | 0.13 | 2.4 | ○ |
| Example 6 | 94.2 | 0.13 | 2.5 | ○ |
| Example 7 | 94.9 | 0.13 | 2.5 | ○ |
| Example 8 | 94.6 | 0.12 | 2.7 | ○ |
| Example 9 | 94.8 | 0.12 | 2.5 | ○ |
| Example 10 | 93.0 | 0.18 | 2.5 | ○ |
| Example 11 | 92.2 | 0.15 | 2.6 | ○ |
| Example 12 | 93.0 | 0.15 | 2.3 | ○ |
| Example 13 | 92.4 | 0.16 | 2.4 | ○ |
| Example 14 | 92.8 | 0.16 | 2.3 | ○ |
| Example 15 | 92.1 | 0.15 | 2.0 | ○ |
| Example 16 | 92.7 | 0.14 | 2.4 | ○ |
| Example 17 | 92.4 | 0.17 | 2.0 | ○ |
| Example 18 | 94.2 | 0.12 | 2.1 | ○ |
| Example 19 | 94.4 | 0.12 | 2.2 | ○ |
| Example 20 | 91.5 | 0.16 | 1.9 | ○ |
| Example 21 | 92.5 | 0.16 | 2.1 | ○ |
| Example 22 | 93.0 | 0.15 | 2.2 | ○ |
| Example 23 | 87.5 | 0.18 | 1.7 | ○ |
| Example 24 | 88.3 | 0.18 | 1.6 | ○ |
| Example 25 | 87.9 | 0.17 | 1.6 | ○ |
| Example 26 | 88.9 | 0.17 | 1.7 | ○ |
| Example 27 | 88.2 | 0.16 | 1.9 | ○ |
| Example 28 | 86.5 | 0.33 | 1.9 | ○ |

TABLE 7

Electrical properties

| | Retention rate Vk 5 (%) | Sensitivity 1/2 (μJ/cm$^2$) | Wear amount (μm) | Contamination resistance |
|---|---|---|---|---|
| Comparative Example 1 | 92.3 | 0.34 | 2.8 | ○ |
| Comparative Example 2 | 92.2 | 0.31 | 4.0 | ○ |
| Comparative Example 3 | 91.9 | 0.40 | 3.0 | ○ |
| Comparative Example 4 | 93.1 | 0.48 | 2.7 | ○ |
| Comparative Example 5 | 92.3 | 0.31 | 2.8 | x |
| Comparative Example 6 | 82.5 | 0.29 | 3.9 | ○ |
| Comparative Example 7 | 84.1 | 0.50 | 4.4 | ○ |

From the results in Tables 6 and 7 above, it can be seen that in Examples 1 to 28 and Reference Example 1, the wear resistance was favorable and the electrical properties exhibited high sensitivity, or the sensitivity and the wear resistance were achieved at the same time, and the contamination resistance was also favorable. On the other hand, in Comparative Examples 1 to 7, it was observed that the sensitivity was low, the amount of film wear after printing was high, or the contamination resistance was insufficient. The reason for achieving favorable results as described above in Examples 1 to 28 and Reference Example 1 is that the light-sensitive layer has a cross-linked structure and that the structural portion responsible for charge transport has a specific structure, although the mechanism is not clear. Furthermore, comparing Example 23 with Example 24, it was found that, in a positively charged layered photoreceptor, cracks in the charge transport layer caused by the formation of a charge generation layer can be suppressed by providing a cured film formed from a composition containing a first hole transport material represented by the general formula (1) as a charge transport layer.

The above confirmed that by using a photosensitive layer containing a charge transport material capable of forming a cross-linked structure, a highly sensitive and contamination-resistant electrophotographic photoreceptor can be obtained while suppressing wear.

DESCRIPTION OF SYMBOLS

1 Conductive substrate
2 Undercoat layer
3 Monolayer photosensitive layer
4 Charge generation layer
5 Charge transport layer
6, 7 Photosensitive layer (layered photosensitive layer)
8 Photoreceptor
21 Charging member
22 High-voltage power supply
23 Image exposure member
24 Developer
241 Developing roller
25 Paper feed member
251 Paper feed roller
252 Paper feed guide
26 Transfer charger (direct charging type)
27 Cleaning device
271 Cleaning blade
28 Static eliminating member
60 Electrophotographic device
300 Photosensitive layer

What is claimed is:

1. An electrophotographic photoreceptor, comprising:
   a conductive substrate; and
   a photosensitive layer provided on the conductive substrate and including a charge transport portion that includes:
      a first hole transport material represented by General Formula (1) below,
      a curable resin as a binder resin, and
      a cross-linked structure between the first hole transport material and the curable resin:

General Formula (1)

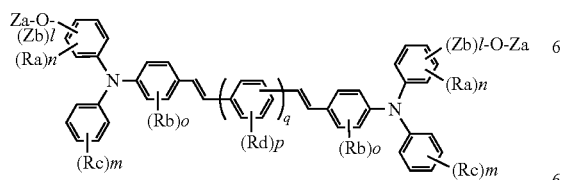

(1)

where:
   in the formula (1),
   Za denotes a polymerizable functional group represented by Structural Formula (2) below,
   Zb denotes a divalent group represented by Structural Formula (6) or (7) below,
   each of Ra, Rb, Rc and Rd denotes a branched or unbranched alkyl group having from 1 to 6 carbon atoms, an alkoxy group having from 1 to 6 carbon atoms, a substituted or unsubstituted phenyl group, or a substituted or unsubstituted styryl group,
   l is an integer of 0 or 1,
   m is an integer in a range of 0 to 5,
   n, o, and p are each an integer in a range of 0 to 4, and
   q is an integer in a range of 1 to 3; and
Structural Formulae (2), (6) and (7)

(2)

(6)

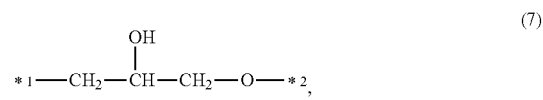

(7)

where:
   in Structural Formula (6), t is an integer in a range of 1 to 6; and
   in Structural Formulae (6) and (7), *1 and *2 respectively represent binding positions,
   wherein Zb is bonded to a phenyl group at a *2 side.

2. The electrophotographic photoreceptor according to claim 1, wherein the photosensitive layer contains a second hole transport material including an arylamine structure that is free of a polymerizable functional group, represented by the structural formula (2), (3), or (4):

Structural Formulae (2) through (4)

(2)

(3)

(4)

3. The electrophotographic photoreceptor according to claim 2, wherein the second hole transport material is a compound represented by Structural Formula (A) or Structural Formula (B) below:

Structural Formula (A)

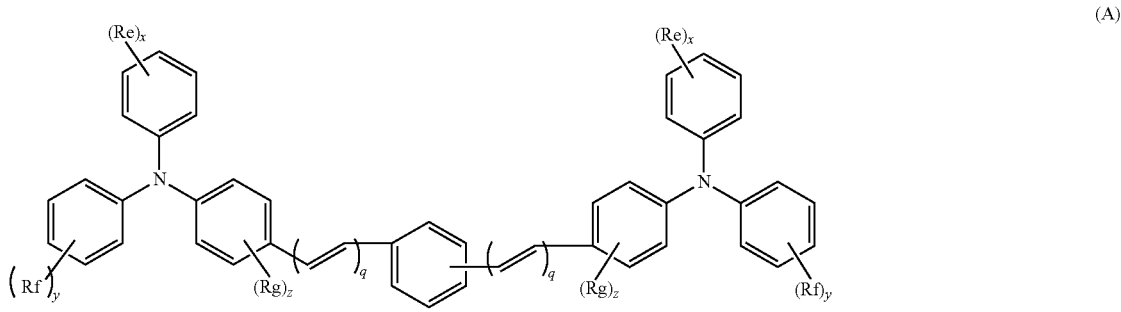

Structural Formula (B)

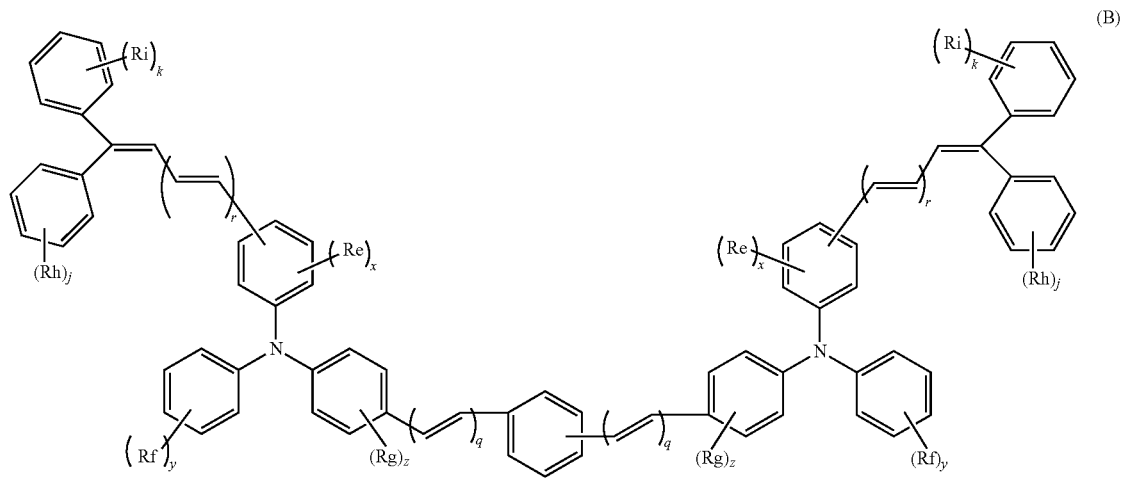

where:

in formulae (A) and (B), each of Re, Rf, Rg, Rh, and Ri is one of a hydrogen atom, a branched or unbranched alkyl group having from 1 to 6 carbon atoms, an alkoxy group having from 1 to 3 carbon atoms, a substituted or unsubstituted phenyl group, a substituted or unsubstituted styryl group, or a substituted or unsubstituted 4-phenylbutadiene group;

x and z are each an integer in a range of 0 to 4;

j, k, and y are each an integer in a range of 0 to 5;

q is an integer in a range of 0 to 2; and r is an integer of 0 or 1.

4. The electrophotographic photoreceptor according to claim 1, wherein the photosensitive layer contains an electron transport material.

5. The electrophotographic photoreceptor according to claim 1, wherein the curable resin is selected from the group consisting of an epoxy resin, a phenolic resin, an acrylic resin, and combinations thereof.

6. The electrophotographic photoreceptor according to claim 1, wherein the photosensitive layer contains a charge generation material made of a phthalocyanine compound.

7. A method of manufacturing the electrophotographic photoreceptor according to claim 1, comprising:

providing a coating liquid containing the first hole transport material and the curable resin dissolved in a solvent;

dip coating the conductive substrate into the coating liquid to provide a coating on the conductive substrate; and heating the coating to cross-link together the first hole transport material and the curable resin and provide the photosensitive layer.

8. An electrophotographic device comprising the electrophotographic photoreceptor according to claim 1.

9. An electrophotographic photoreceptor that is a negative-charged, multi-layered photoreceptor, comprising:

a conductive substrate; and a photosensitive layer including:

a charge generation layer that is provided on the conductive substrate and that comprises a charge generation material and a resin binder that is cross-linked; and a charge transport layer that is provided in direct contact with the charge generation layer and that includes a charge transport portion that includes:

a first hole transport material represented by General Formula (1) below, a curable resin as a binder resin, and a cross-linked structure between the first hole transport material and the curable resin:

General Formula (1)

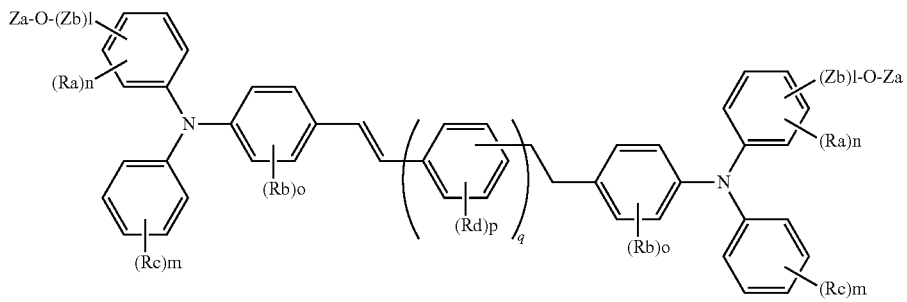

where, in Chemical Formula (1),

Za denotes a polymerizable functional group represented by Structural Formula (2) below, Zb denotes a divalent group represented by Structural Formula (6) or (7) below, each of Ra, Rb, Rc and Rd denotes a branched or unbranched alkyl group having from 1 to 6 carbon atoms, an alkoxy group having from 1 to 6 carbon atoms, a substituted or unsubstituted phenyl group, or a substituted or unsubstituted styryl group, l is an integer of 0 or 1, m is an integer in a range of 0 to 5, n, o, and p are each an integer in a range of 0 to 4, and q is an integer in a range of 1 to 3; and Structural Formulae (2), (6), and (7)

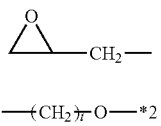  (2)

—(CH$_2$)$_t$—O—*2  (6)

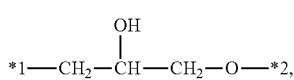  (7)

where:

in Structural Formula (6), t is an integer in a range of 1 to 6; and in Structural Formulae (6) and (7), *1 and *2 respectively represent binding positions, wherein Zb is bonded to a phenyl group at a *2 side.

10. The electrophotographic photoreceptor according to claim 9, wherein the charge transport layer further comprises a second hole transport material including an arylamine structure that is free of a polymerizable functional group, represented by the structural formula (2), (3), or (4):

Structural Formulae (2) through (4)

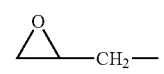  (2)

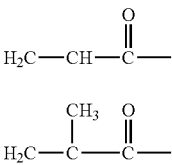  (3)

(4)

11. The electrophotographic photoreceptor according to claim 10, wherein the second hole transport material is a compound represented by Structural Formula (A) or Structural Formula (B) below:

Structural Formula (A)

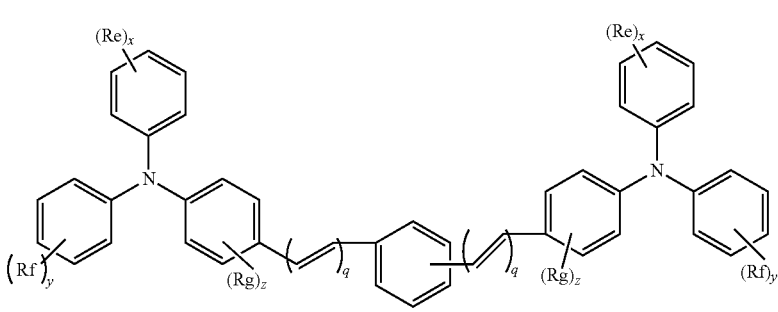  (A)

Structural Formula (B)

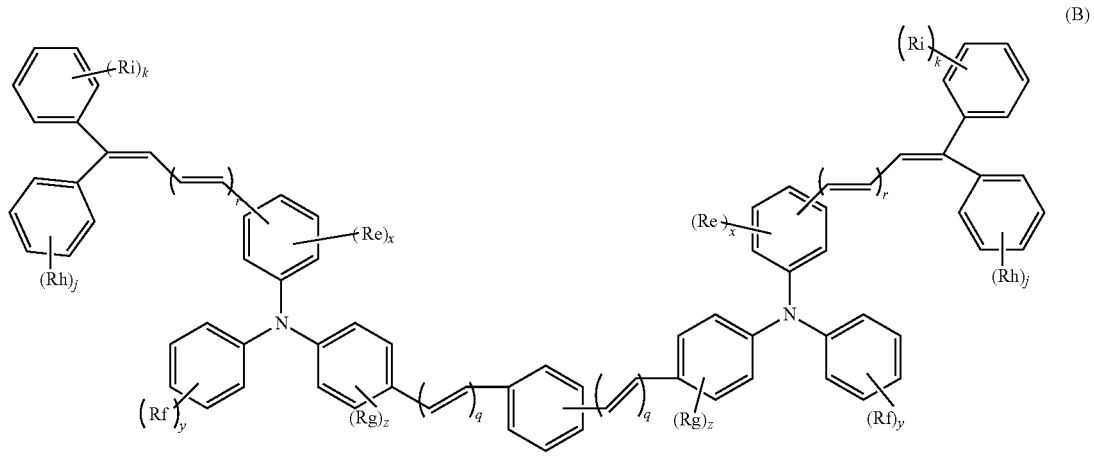

where:
in formulae (A) and (B),
each of Re, Rf, Rg, Rh, and Ri is one of a hydrogen atom, a branched or unbranched alkyl group having from 1 to 6 carbon atoms, an alkoxy group having from 1 to 3 carbon atoms, a substituted or unsubstituted phenyl group, a substituted or unsubstituted styryl group, or a substituted or unsubstituted 4-phenylbutadiene group;

x and z are each an integer in a range of 0 to 4;

j, k, and y are each an integer in a range of 0 to 5;

q is an integer in a range of 0 to 2; and r is an integer of 0 or 1.

12. The electrophotographic photoreceptor according to claim 9, wherein the charge transport layer further comprises an electron transport material.

13. The electrophotographic photoreceptor according to claim 9, wherein the curable resin is selected from the group consisting of an epoxy resin, a phenolic resin, an acrylic resin, and combinations thereof, and wherein the charge generation layer contains a charge generation material made of a phthalocyanine compound.

14. An electrophotographic photoreceptor that is a positive-charged, monolayer photoreceptor, comprising:
a conductive substrate; and
a photosensitive layer that is provided on the conductive substrate and that comprises a charge generation material and a charge transport portion that includes:
a first hole transport material represented by General Formula (1) below,
a curable resin as a binder resin, and
a cross-linked structure between the first hole transport material and the curable resin:

General Formula (1)

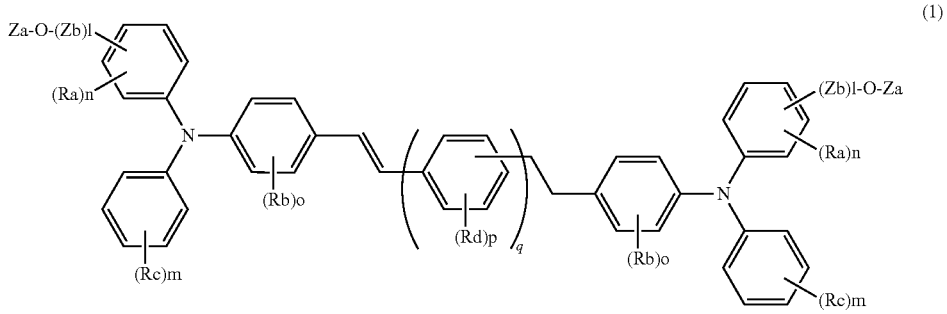

where, in Chemical Formula (1),
Za denotes a polymerizable functional group represented by Structural Formula (2) below,
Zb denotes a divalent group represented by Structural Formula (6) or (7) below,
each of Ra, Rb, Rc and Rd denotes a branched or unbranched alkyl group having from 1 to 6 carbon atoms, an alkoxy group having from 1 to 6 carbon atoms, a substituted or unsubstituted phenyl group, or a substituted or unsubstituted styryl group,
l is an integer of 0 or 1,
m is an integer in a range of 0 to 5,
n, o, and p are each an integer in a range of 0 to 4, and
q is an integer in a range of 1 to 3; and
Structural Formulae (2), (6) and (7)

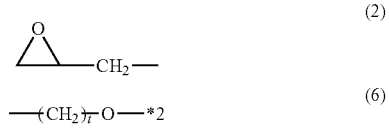

-continued

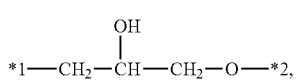
(7)

where:
in Structural Formula (6), t is an integer in a range of 1 to 6; and
in Structural Formulae (6) and (7), *1 and *2 respectively represent binding positions,
wherein Zb is bonded to a phenyl group at a *2 side.

15. The electrophotographic photoreceptor according to claim 14 wherein the photosensitive layer further comprises a second hole transport material including an arylamine structure that is free of a polymerizable functional group that is represented by the structural formula (2), (3), or (4):
Structural Formulae (2) through (4)

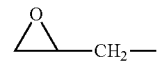
(2)

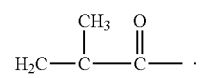
(3)

(4)

16. The electrophotographic photoreceptor according to claim 15, wherein the second hole transport material is a compound represented by Structural Formula (A) or Structural Formula (B) below:

Structural Formula (A)

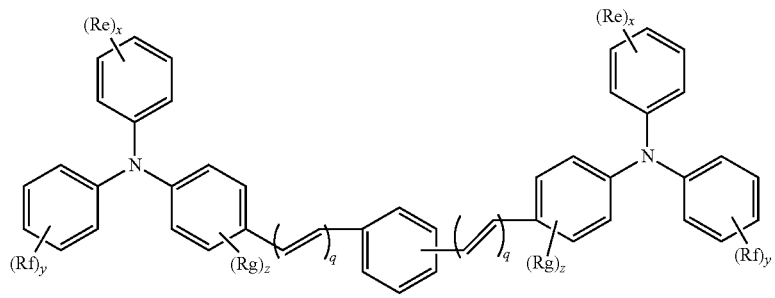
(A)

Structural Formula (B)

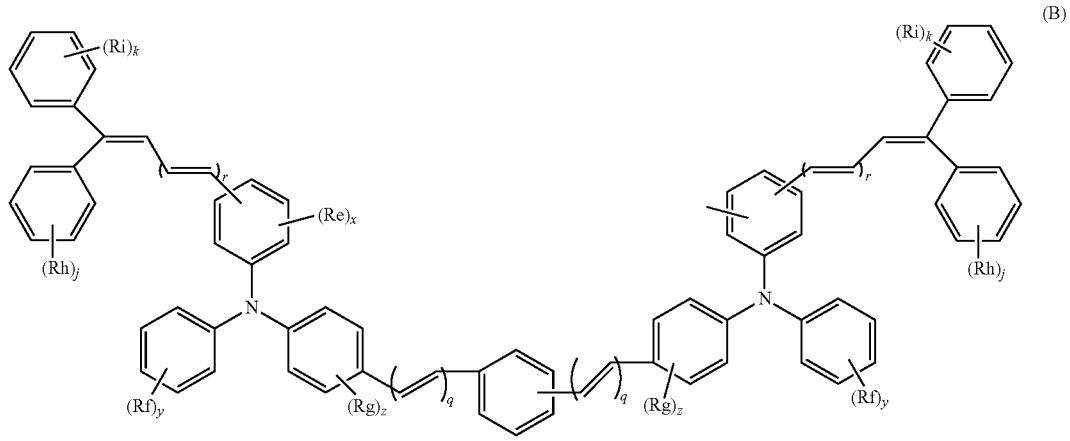
(B)

where:
in formulae (A) and (B), each of Re, Rf, Rg, Rh, and Ri is one of a hydrogen atom, a branched or unbranched alkyl group having from 1 to 6 carbon atoms, an alkoxy group having from 1 to 3 carbon atoms, a substituted or unsubstituted phenyl group, a substituted or unsubstituted styryl group, or a substituted or unsubstituted 4-phenylbutadiene group;

x and z are each an integer in a range of 0 to 4;

j, k, and y are each an integer in a range of 0 to 5;

q is an integer in a range of 0 to 2; and r is an integer of 0 or 1.

17. The electrophotographic photoreceptor according to claim 14, wherein the photosensitive layer further comprises an electron transport material.

18. The electrophotographic photoreceptor according to claim 14, wherein the binder resin is selected from the group consisting of an epoxy resin, a phenolic resin, an acrylic resin, and combinations thereof, and wherein the charge generation material is a phthalocyanine compound.

19. The electrophotographic photoreceptor according to claim 14, further comprising a charge transport layer that is provided between the conductive substrate and the photosensitive layer, and that includes:
the first hole transport material represented by General Formula (1),
a cured resin as a binder resin, and
a cross-linked structure between the first hole transport material and the cured resin.

20. The electrophotographic photoreceptor according to claim 1, wherein the curable resin is an epoxy resin.

* * * * *